(12) United States Patent
Lerner

(10) Patent No.: US 11,572,982 B1
(45) Date of Patent: Feb. 7, 2023

(54) HYDROGEN FUELING SAFETY INDICATOR

(71) Applicant: William Seth Lerner, Litchfield, CT (US)

(72) Inventor: William Seth Lerner, Litchfield, CT (US)

( * ) Notice: Subject to any disclaimer, the term of this patent is extended or adjusted under 35 U.S.C. 154(b) by 0 days.

(21) Appl. No.: 17/347,427

(22) Filed: Jun. 14, 2021

Related U.S. Application Data

(60) Provisional application No. 63/039,118, filed on Jun. 15, 2020.

(51) Int. Cl.
*F17C 7/00* (2006.01)

(52) U.S. Cl.
CPC .......... *F17C 7/00* (2013.01); *F17C 2221/012* (2013.01); *F17C 2250/0636* (2013.01); *F17C 2265/065* (2013.01)

(58) Field of Classification Search
USPC ........................................................ 141/96
See application file for complete search history.

(56) References Cited

U.S. PATENT DOCUMENTS

| 6,899,151 B1 * | 5/2005 | Latka .................. | B67D 7/426 |
| | | | 141/94 |
| 2017/0074707 A1 * | 3/2017 | Mathison ............... | G01F 22/02 |
| 2018/0205102 A1 * | 7/2018 | O'Brien ................ | F17C 7/00 |
| 2020/0173607 A1 * | 6/2020 | Mathison ............... | F17C 5/06 |
| 2020/0276909 A1 | 9/2020 | Boisen et al. | |
| 2020/0346554 A1 | 11/2020 | Boisen et al. | |
| 2020/0363016 A1 | 11/2020 | Gambone et al. | |

FOREIGN PATENT DOCUMENTS

| CA | 2844897 A1 * | 9/2014 | ............. F17C 5/007 |
| JP | H07260773 A * | 10/1995 | ........... G01N 21/553 |

OTHER PUBLICATIONS

JPH07260773A—English Translation (Year: 1995).*
Society of Automotive Engineers (SAE) International J2601, Surface Vehicle Standard (Year: 2014).*
Temperature Limit Values for Touching Cold Surfaces with the Fingertip, Geng et al. (Jun. 15, 2006—online publication).

* cited by examiner

*Primary Examiner* — Daphne M Barry
*Assistant Examiner* — Christopher M Afful
(74) *Attorney, Agent, or Firm* — Appleton Luff

(57) ABSTRACT

One or more indicators provide an indication of fueling status of a hydrogen powered vehicle. One or more sensors detect temperature and/or other characteristics of the fuel provided to the vehicle and provide an electrical signal to one or more of the indicators to permit an indication of fueling status. The indicators, which may be visual and/or audible, may be positioned on the fueling apparatus and on the vehicle in the vicinity of a fueling receptacle. The indicators may also be positioned elsewhere on the vehicle and may be separate from the vehicle such as on or around a fueling station and/or on separate computerized devices.

22 Claims, 18 Drawing Sheets

HYDROGEN FUELING SAFETY INDICATOR

RELATED APPLICATIONS

This application claims priority to U.S. provisional patent application 63/039,118 filed on Jun. 15, 2020, which application is hereby incorporated by reference in its entirety.

FIELD OF THE DISCLOSURE

This disclosure relates generally to fueling of vehicles and more particularly to systems for improving fueling safety.

BACKGROUND

Vehicles powered by hydrogen, often referred to as FCEVs (Fuel Cell Electric Vehicles) have recently been introduced. Such vehicles appear to the ordinary driver/operator to operate very similarly to conventional fossil fuel (e.g., gasoline, diesel) powered vehicles. Fueling of such vehicles has been designed to mimic in some ways fueling of fossil fuel-based vehicles. The characteristics of hydrogen however pose threats to operators of hydrogen powered vehicles. What is needed are improved systems, apparatus and methods for safely and predictably refueling vehicles powered by energy sources, such as hydrogen, that differ from conventional fossil fuels

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques.

DETAILED DESCRIPTION

Figure 1:
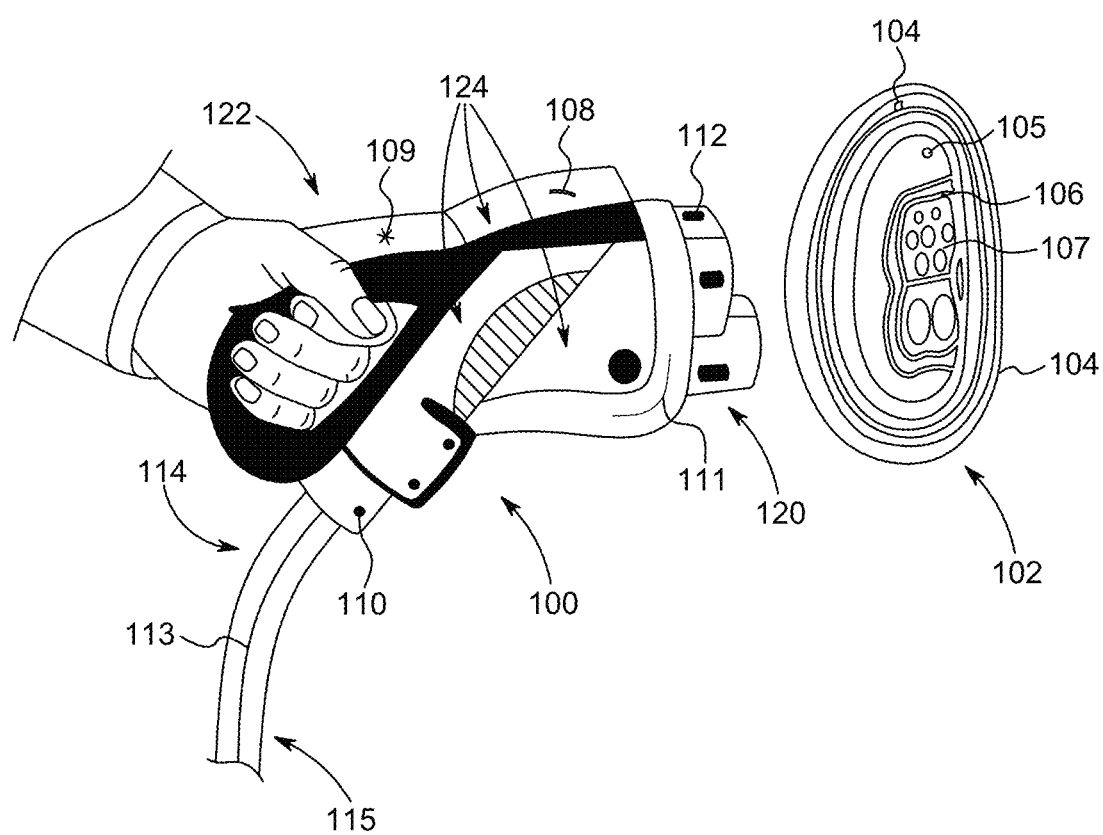
FIG. 1 is a view of a first embodiment of a hydrogen fueling handle and receptacle that operates to provide information regarding fueling status.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

As used herein, the term "vehicle" includes a thing or device with a self-contained motor or similar apparatus that causes movement of the thing or device, and which contains a source of energy. The vehicle may be used for transporting people or goods, such as those that move on land or water (on water or underwater), in the air, within the earth's atmosphere or in outer space or the vehicle may not necessarily transport anything other than the vehicle itself, such as a satellite, or a car or flying drone equipped with cameras or other sensors. The source of energy may be, by way of example, petroleum-based fuel, other type of liquid or solid fuel (such as liquified hydrogen, or propane) or may be a battery, or may be a combination thereof.

Hydrogen technologies are not widely understood by the public. Only 11,000 fuel cell vehicles are currently on the road as of January 2020. In contrast, the first purpose-built gas station was opened in 1905, and for the past one hundred and fifteen years, the public has come to understand gasoline powered vehicles, gasoline stations, and the properties of gasoline as a fuel which powers their automobiles, trucks, buses, trains, boats, motorcycles, etc. Hydrogen as a pre-cooled compressed gas is virtually unknown to consumers. FCEVs (Fuel Cell Electric Vehicles) act like "normal" cars in the sense that the operator (driver) gets in the car, starts it, drives it like a gasoline powered car, and when the fuel is low, the car is taken to a self-service refueling station. The station looks similar to a gasoline station, and so does the "pump", sometimes referred to as a fueling dispenser. A typical pump is a tall rectangle, with a display, and a hose and handle similar to a gasoline pump. The vehicle has a fueling door that opens, like a gasoline vehicle, but here is where the similarities end. Instead of the consumer finding a plastic gas cap that they twist and remove, or "capless" filling nozzle insert, they find a round bar of metal, with a small opening at the end, that goes into the vehicle. On top of the end ball, bar or connection device, there is a small plastic cap. The consumer swipes his or her credit card, chooses between two current fill levels (350 or 700 bar, higher in the future) grabs the large handle and connects the end which looks like a gas nozzle to the vehicle. The fueling handle does not have the usual 10 inches or so, slightly curved metal tube, that slides into the tank of a gasoline or diesel-powered vehicle. This procedure is known to any individual that has ever driven or filled a car, since the first purpose-built gasoline station was built in 1905. This is where all similarities end. For gasoline fueling, the driver or attendant can take the handle and insert it into the vehicle without any conscious thoughts. The long tube is tightly inserted into the hollow tube, guided in, and stops when it is inserted. To begin the fueling process, you simply pull the trigger like metal bar, let it click in place and you can get back in the car (or stand by it, manually holding the lever on the filling handle, if no such self-pumping mode is built into that handle). We do this without really paying attention. It has become a reflex without thought, like tying a sneaker.

The fueling handle for an FCEV does not slide into place. It is attached to the fueling nozzle inside the covered door area of the vehicle. It clicks and locks into place. Metal to metal. The handle is heavy, the attachment nozzle is small. It is not a rote experience. Attention must be paid. Why? Hydrogen coming out of the fueling handle is pre-cooled to −40 to −50 C. One drop on exposed skin will likely cause a disfiguring third degree burn. The elderly have thinner skin than the young and are even more susceptible to thermal injuries. Additionally, the elderly may "freeze" in a moment of panic. Children exhibit the same documented behaviors. If the pre-cooled hydrogen leaks onto a wearer's foot in sandals (such as "flip flops") the same situation will occur. Once the fill is completed, the whipping effect of the return of the nozzle to the dispenser pump can spray the hydrogen to others in the vicinity. Additionally, young individuals may be curious and touch the end of the pump or the fueling connector, which will cause a contact burn immediately and the exposed skin may become attached to the end of the fueling handle, or vehicle connector. The fueling procedure must be taught, learned and carefully followed. Studies of distraction from mobile phones, emails, texts, social media, and the like, can nullify attention spans, especially when a situation seems familiar.

There is unfortunately no margin for error concerning safely refueling a FCEV vehicle, and carefully returning the handle to the dispenser. The public does not understand hydrogen as a filling medium, and its potentially grave consequences. In one case a woman pulled her FCEV into a fueling station, parked and went into the store area. The passenger switched seats and proceeded to fill the hydrogen vehicle. The woman came out of the station, and got in the car, and drove off, assuming the fill was completed. It was not. The car went fifty feet or so, and she stopped. The passenger and two unrelated individuals from different areas of the station ran to the car, and proceeded to remove the handle, which was attached to the vehicle, without its hose attached. Due to the inexperience or made up "safety response" or needs, they were clueless about the handle's temperature. It was clearly up to −20 to 40 C, depending on the specifics. All three individuals were treated for thermal injuries and taken from the station in three different ambulances.

When a person fills a hydrogen vehicle, they have to remove a small plastic cap, and after the fill they have to replace the plastic cap. At night they may not be able to see the cap perfectly due to shadows. The nozzle can become so cold it can cause a thermal injury in seconds or skin can become frozen to it. Additionally, men with very large hands, or women with long fingernails may have issues taking off plastic cap and putting it back on. The system is designed with the average person in mind. Again, hydrogen fueling is novel to most, and there are no courses for the public to take, and generally not much interest by consumers in learning the differences between gasoline and hydrogen refueling. Even if a dealer shows the new owner everything, one of the owner's children or friends may borrow the vehicle. Also, if FCEVs become rental cars, the chances for injury increase as the renters are less likely to be familiar with the fueling procedures and the associated dangers. Motorcycles present another level of danger, because they are inherently unstable, and if knocked over due to a bump or a kickstand malfunction, they could cause a "breakaway" situation, where the hose separates from the filling handle, whipping the hydrogen about before the safety cut off prevents hydrogen from coming out of the hose that is detached from the handle.

Hydrogen as a fuel presents uncountable differences and additional hazards that gasoline or diesel does not experience. Back-to-back fills at a hydrogen station can alter the dynamics, pressures in the storage tank, and vehicle tank can present challenges, rubber seals, and hoses are subject to greater pressure and colder temperatures. The pre-cooled hydrogen goes through a fueling hose at roughly −40 to −50 C. Gasoline may be delivered from a dispenser to a vehicle at ambient temperatures, while a hydrogen station's hose can have it contents be −40 and deliver them when it is 106 Fahrenheit. The thermal differences take a toll on the equipment which could lead to premature failures. Human error (such as not tightening a bolt) has already led to an explosion in a hydrogen fueling station. Because hydrogen performs differently, the leak presented a force that set off vehicles air bags in the vicinity. Enough real-world incidents to safely predict all parameters have not yet occurred. By way of example, a hydrogen vehicle being fueled during a monsoon in Miami, Fla., where it is 102 F and humid, may be very different that a fill in a blizzard in Alaska. Sensors, networks and other types of wired and wireless communications can fail due to moisture, heat, freezing and rapid temperature changes. Areas such as in Connecticut may have a summertime high of 98 F and a wintertime low of −6 F. We do not have sufficient data as to how these systems of communication between the vehicle and the dispenser will function properly. We also assume that the vehicle has not been damaged, or improperly repaired before it is filled. Many substandard repairs to engines and fueling lines occur at repair facilities, exponentially increasing the likelihood of a leak, explosion, fire, etc. If there is a break away situation where a hose is severed from the handle or vehicle, the remaining material in the hose can cause an instant thermal injury to one's hand, face, neck, eye or foot. The dispenser is designed to stop the fueling process during a "break away" situation (meaning if someone forgets to disconnect the handle from the vehicle and drives away) but there is no measure to stop the cooled hydrogen in the hose at the time. That is simply dispersed into unknown areas.

California currently has 36 hydrogen refueling stations, along with one in Hawaii—these two states are the only ones where the Toyota Mirai FCEV is currently offered for sale. Toyota is reportedly seeking to expand its fuel cell vehicles to the northeastern US as there are several hydrogen refueling stations throughout New England. This is hampered however by regulatory issues and legacy laws concerning transporting hydrogen through tunnels and over bridges.

An FCEV cannot be driven in a tunnel in New York as of October 2019, because the safety systems cannot handle non-gasoline powered vehicle events. The disclosed embodiments address the above-noted issues and permit certain usage of hydrogen vehicles in tunnels and bridges and in certain parking structures.

A number of incidents in hydrogen fueling systems have been experienced and the risk of failure can arise from a number of components in the fueling system including, compressor fracture, hose disintegration, dispenser handle embrittlement, dispenser leakage, valve leakage, O-ring extrusion, O-ring swelling, O-ring rupture, etc. These issues are documented and have caused accidents in Korea (May 2019), Norway (June 2019) and the US (June 2019) for example. The incident in Norway was at a hydrogen fueling station. Hydrogen was leaking from equipment at the station. The leak was due to human error, where a connection was not installed, and tightened properly. There was a fire, and explosion. The injuries were not due to the hydrogen fire but were sustained due to the explosion which triggered airbags to deploy in nearby vehicles. This is highly unusual, but an unaddressed concern. If the occupants of the vehicle or those around the station were warned of a potential explosion, and unintended side effects, the airbag injuries might have been mitigated. A visual and or acoustical warning such as disclosed herein should have occurred at the station, immediately after the leak was detected. Everyone at the station, should have been alerted to immediately exit the station and surrounding area. The public does not understand the differences between hydrogen and other fuel sources. The industry and the standards bodies are still collecting information. What is needed first are safety protocols to protect the public and workers.

The alert and information as disclosed herein can take the form of illuminating the dispenser as a whole, the "island" of fueling dispensers, the roof above the dispensers, the entry sign to the station or the typical "house" that has the attendant, and soft drinks, and bathrooms. In certain embodiments, the alert can keep individuals and cars entering a station where there is a malfunction. In such embodiments, there is a visual and or acoustical alert that warns or blocks others from entering the danger zone. For example, if the nozzle is frozen to the vehicle, the driver needs to know when it is thawed. The driver can then remain in the vehicle until the warning symbol/visual indicator and or sound component (acoustical indicator) alerts the driver, they can exit the vehicle and remove the filling handle. Or if the driver goes into the station's store area, they will be able to see by a light on the dispenser and or a light on the vehicle alerting them of the frozen situation, and when it is safe to remove the handle from the vehicle.

On vehicles, the indicator can be at the fueling connector and/or on the instrument panel indicating a safe refueling state, and a problematic freezing of the nozzle to the vehicle. This is a known problem and documented in Toyota and Honda FCEV manuals. As specified in such manuals, if the nozzle becomes frozen to the vehicle, the driver must wait until it thaws, in order to remove the filling handle from the vehicle's nozzle. The time for thaw, can be ten or more minutes. Not addressed by such guidance is that the driver should be informed when the nozzle is no longer frozen to the vehicle. In certain of the disclosed embodiments, the driver can remain in the vehicle until the warning symbol/visual indicator and or sound component alerts the driver, they can exit the vehicle and remove the filling handle. With current fueling apparatus, it is not safe or practical for drivers to stand by a vehicle alone at night, nor not know if they can leave the station. With the disclosed embodiments, if the driver goes into the station's store area, they will be able to see by a light on the dispenser and or a light on the vehicle alerting them of the frozen situation, and when it is safe to remove the handle from the vehicle.

In certain of the disclosed embodiments, the information can also be transmitted to other vehicles, with or without drivers. Autonomous vehicles may play a dominant role in the future, and the occupants must know where the accident is, and what is the safest way to exit to safety, to avoid a fire or hydrogen venting situation. The alert can take the form of an alert in the in-cabin screen and or an audible alert, using a recorded voice or any other type of warning. Vehicles will be connected via one or more communication methods including Bluetooth, Wi-Fi. Certain of the disclosed embodiments permit the system to be accessed remotely by emergency responders, to guide the occupants. For an individual passenger, driver driven cars, the alert and guidance can appear on the IP (Instrument Panel), Navigation screen or in the "Head's Up" display. It will alert the driver as to how to exit the vehicle and the path to take, if it is safe to exit the vehicle. If it is not safe to exit the vehicle, the responders can communicate vocally, through an acoustical alert, or through any display system that they should remain in the vehicle, until rescued or it is safe to exit. The disclosed embodiments in this respect benefit passengers, the public and all first and secondary responders. The disclosed status indicators can be visual and/or acoustical, and sent by any known means, today or in the future, such as for example, the "Google Glass" product by Google or a similar type of "Head's Up" type message transmission into a normal looking pair of glasses.

In accordance with certain of the disclosed embodiments, an emergency team can send received information regarding an emergency fueling situation directly to those who need guidance, warnings, or directions like a vehicle's navigation system. The path to safety can also be directly sent to the vehicle, in a navigation style message, or to the user's smartphone. In certain embodiments, the received alert information can cause activation of a mapping and/or guidance application (such as Google Maps) to provide the driver and/or occupants, with clear directions, seamlessly as they leave the vehicle. The vehicle occupants may also be provided with a portable, lighted path (by way of activating the flashlight of the phone(s) of one or more of the vehicle occupants) to safety. The emergency guidance can be programmed to turn the flashlight feature of the phone on, lighting the path below, while having the path on the screen of the phone. This can be done automatically, since during emergencies it may not be easy for those seeking safety to spend time opening the alert and turning on the flashlight feature. The goal is to clear the area as soon as possible, in the clearest and easiest way possible, especially at night, or during a smoke-filled fire incident. In another embodiment, the main screen of a mobile device may be lit up, such as turned bright white, to operate as a low lumen flashlight, in addition to or in lieu of using the flash on the mobile device. Controlling the mobile device to operate as a low lumen flashlight permits the mobile device to be operated as a rescue beacon. The lighting of the screen(s) and/or flash(es) of the mobile device may be performed in a number of manners including at various illuminations and/or flashing.

A lack of understanding about hydrogen as a fuel source also exists in the railway, truck and maritime uses of hydrogen. For example, if large ships are powered by hydrogen, fueling boats will dock alongside them and fill them. Safety issues arising from such fueling scenarios not been addressed, because they are not scaled up. Certain of the disclosed embodiments pertain to hydrogen filling stations, and all machinery that uses the hydrogen from the station to ultimately power a machine. A machine in such a context is defined as a car, truck, ship, drone, bus, dump truck, railroad car, autonomous vehicle, submarine (not submerged for a fill) boat, moving crane, subway car, etc. The disclosed embodiments also pertain to other equipment such as portable hydrogen generators, lawn mower equipment, golf carts, motorcycles, and any movable machinery that a user, must fill with hydrogen.

Fuel cell-based water ferries are being planned to be in operation by 2021. The hydrogen fueling of the ferry may be performed at a dock, where the boat is, or remotely by a filling ship that pulls alongside the vehicle. This involves fueling operations in the presence of potentially hundreds of unprotected passengers aboard, and outside on deck. Ferry operators are familiar with diesel or gas fueling, but not hydrogen fueling. In the context of this disclosure, the entire filling ship is treated like a dispenser. It is a unit that dispenses hydrogen using a hose and connector. The "dispenser" does not have to take the traditional form as a typical gas station. Additionally, fueling handles, connectors, hoses, couplings, etc. are sensitive to corrosion, from sea water. Also susceptible are fueling stations in coastal areas where there may be an increased saline presence due to the crashing sea's spray. Also, there have been developed systems that provide the ability to make on demand hydrogen. It is not scaled up to be widely used, due to ongoing development, and cost factors. The definition of "hydrogen dispenser" related to this disclosure is the self-generating equipment treated as a dispenser, since it will function as such.

The disclosed status indicators can be visual and/or acoustical and sent by one of a variety of techniques, such as for example, "Google Glass" or a similar "Head's Up" type message transmission into a normal looking pair of glasses. An emergency team employing such an embodiment can send the information directly to those who need guidance, warnings, or directions like a vehicle's navigation system. The path to safety can also be directly sent to the vehicle, in a navigation style message, or to the user's smartphone, which can open up an application, such as Google Maps, and give the occupants, clear directions, seamlessly as they leave the vehicle, and have a portable, lighted path to safety. The emergency guidance can be programmed to turn the flashlight feature of the phone on, lighting the path below, while having the path on the screen of the phone. This can be done automatically, since during emergencies it may not be easy for those seeking safety to spend time opening the alert and turning on the flashlight feature. The goal is to clear the area as soon as possible, in the clearest and easiest way possible, especially at night, or during a smoke-filled fire incident.

In hydrogen fueling, if a coupling, seal, hose, or handle fails, the enormous pressure of a 350 or 700 BAR (700 Bar.=10,152.64164 Psi (Psi)) fill can disperse hydrogen that is pre-cooled to a temperature range of −40 to −50 C (in 2020). This hydrogen will potentially cause third degree burns to unprotected skin. Breakaway devices, which are defined as hydrogen handle dispenser to vehicle unintended separations, do have standards, but no acoustical or visual warnings are noted. Systems exist to shut off all internal connections compressors, valves filters, storage tanks, shut off valves, check valves etc. The specific break away, will vary from dispenser to dispenser and is designed to stop the flow of hydrogen out of the hose if the handle is separated due to a user error or equipment malfunction. This can include a drive away situation, where the driver forgets the handle is still attached to the car, or due to a cracked hose that separates from the handle in an unanticipated way. The hose may have been subjected to a run over situation by a car or truck, or may have been dropped with great force, which eventually could cause the handle to separate from the filling hose. Failures can also be caused or facilitated by aging which can cause embrittlement in parts and by improper installation or maintenance and dropping of the hose in normal use.

Humidity of certain levels can increase the chance of freezing of the fueling nozzle to the vehicle. Back-to-back fueling can also contribute to such freezing. For example, a hydrogen dispenser that fills two cars per hour, has a different temperature or moisture level that a dispenser filling twenty cars per hour. Ambient temperatures also factor into the equation. Meaning, in Northern Canada in the winter the temperature may be −10 F, and in Arizona it could be 110 F. Both examples have completely different baseline humidity.

Additionally, each state in the United States for example may have its own unique set of rules for fueling and re-fueling. For example: a vehicle owner is allowed to fill a vehicle at a "self-service" station in New York, but a mile away, in New Jersey, the owner is forbidden by law to fill a vehicle. This patchwork of rules creates its own set of known issues. The owner of the vehicle may know how to properly fill their vehicle due to experience or reading the manual. The station attendant in new jersey, may not be trained on how to fill a vehicle properly. The attendant is in all likely hood has not been to training courses, read manuals, or have been properly instructed. Often these employees have no training because they are often entry level jobs, requiring no skills in the art of refueling protocols. There may be language barriers and there may be lack of respect for the owner's vehicle and for the station's property. The owner of a vehicle may carefully connect the refueling handle to his or her car, making sure that the connection is correct, and that they do not drop the fueling handle, as to damage it, their car or injure a foot for example. The employee of the station that requires an attendant to fill the vehicle, may be careless, distracted or not realize or respect the property of the employer or customer. This repetitive carelessness can create very dangerous situations. The repeatedly dropped refueling handle will be damaged, may leak or not seal properly to a vehicle, creating a greater chance of a fire of incident. The attendant may bang the nozzle into the fueling receptacle so often that the end of the vehicle's connector had indentations. They may attach it in a violent and abusive manner and may do the same at the end of the fill. This repetitive abuse can cause unknown perpetual incidents. Standards are written to be followed, and data is derived from the intended design. This is just one example of potential source of perpetual issues concerning fueling and refueling.

Standards and data for usage and testing in a variety of areas are lacking, including, testing of equipment and data on the usage in the field of dispensers, breakaways (or drive away events), tank pressure testing for optimal fill results, effect of back-to-back refueling, lifecycle of hoses and related components, nozzles, coupling of nozzles with different flow rates, connection hardware, or wired, wireless, or any other means of communications between the dispenser and the vehicle. The breakaways or drive-aways, are well known in the field and function as intended. However, with hydrogen fueling there is no agreement of force of separation (666 newtons to 2000 newtons) and there are documented issues where the breakaway occurred from an attendant dropping a fueling handle. There is also documentation where a customer drove off, with the nozzle in the vehicle, and the fueling hose got caught on the dispenser and pulled the fueling dispenser out of the housing, creating a very dangerous situation. There is currently little agreement among the suppliers of the hydrogen, the suppliers of the components and the automakers. ISO (The International Organization for Standardization, which represents 164 member countries, CSA (Canadian Standards Organization) and SAE (Society of Automotive Engineers) and regulatory and standards bodies from up to 164 individual countries, like AFNOR from France, for example, all come together with global experts and are currently trying to gather the disparate information, and data, with no clear direction to harmonizing the directions. An example of this alarmingly dangerous, and life-threatening situation, is that the largest supplier of fueling nozzles, hoses, and handles, has fittings that do not allow low flow equipment to be used for heavy duty use. They prevent bursting and dangerous malfunctions by making the connections different, however only on some parts, and are working towards full protection. Another global supplier has no such safeguards in place and all components are fully interchangeable. Meaning a hose designed for 35 megapascals, can be swapped for use in a 70 megapascal application, creating unforeseen issues, which could lead to bursting, fires, explosions, etc. Furthermore, there is no way to immediately tell what the combination of components are at a fueling station. Marine, Industrial, rail, motorsports, including motorcycles, ATV's, jet ski and any other form of transportation, for leisure or commerce have not been standardized or even have working drafts to achieve such goals.

Among the many issues that exist: (i) common universal language to describe the issues and standard is not agreed upon. (ii) Lack of coding of the nozzles which include: H25, H35, H35HF, H50, H70, etc. HF designates high flow, which increases all stress parameters, making them more susceptible to issues. In the future the industry will focus on high flow fills and begin to retrofit many older designs. The retrofit parts are often not compatible or suitable. It was disclosed that many non-high flow hoses can be used with high flow equipment causing alarming issues, safety wise and overall failure issues. (iii) Some dispensers have data interfaces, and some vehicles do also. However, in any scenario a vehicle with a data interface, may be filled at a station without a data interface, rendering it useless. And the fueling station may have a data interface, but not communicate with a vehicle that lacks one. And there is no standard for the data interface, if it will actually be implemented to scale and what information or actions it may set in motion. (iv) A nozzle designed for a data interface, can be swapped with a nozzle that was not designed for a data interface. The station owner will not be able to execute or observe any data, since the owner may not know that issue is retarding communication. It is not obviously different and fits perfectly like the correct one. (v) Compatibility testing is currently being discussed, with no globally agreed up standards in place. (vi) Breakaway separation: that is when the hose disconnects from the fueling handle if there is an accidental drive off by a driver after executing a fill but not removing a handle. With traditional gasoline or diesel dispensers, this is well known, and effective. The reason is that gasoline is delivered at ambient temperature, not severely pressurized, flows normally through a standardized hose, into a vehicle. The gasoline is stored as a free-flowing liquid in a car's tank. With a hydrogen dispenser, you have a storage tank above or below ground, that pre-cools the hydrogen to −40 to −50 C, distributes it at 35 to 70 Bar, and pressure fills a tank or three in a vehicle. The parameters for issues are unforeseeable. What will happen if the storage tank of the dispenser produces hydrogen that flows to the vehicle at −60 or −30? How will that affect the dispenser unit, the hose and the vehicle. What will the additional 10 C do to the hoses, fittings, handles, etc. Will the vehicle nozzle reject the added pressure and kick back the hydrogen on to the customer filling the vehicle? Will the hose burst, showering the user with −60 C hydrogen? We simply do not currently know. (vii) Currently breakaway separation (or "drive away separation) is 667 Newtons. Proposals and usage are documented at 1000 Newtons. 1300-2000 Newtons of force are also being discussed. There is no current agreement as to what force to choose. There have been documented incidents where the separation happened at the wrong time or because the hose was caught on a part of a dispenser, or the hose became wrapped around itself. Violent drops can mimic break away situations, spraying the hydrogen causing severe injuries or violent fires and explosions if the user is smoking. Tests typically occur at ambient temperatures in controlled environments without deviating improper human behaviors which occur with frequency. We have all seen consumers fill their gasoline vehicles while smoking. We have also experienced consumers twisting hoses when putting them back in the fueling receptacle. When you go to fill your vehicle, it will often leave the cabinet with force and twist about. Additionally, some hoses are constantly tugged on by consumers who do not pull their cars close enough to the fueling dispenser and tug on the handle and hose to reach the vehicle. Consumers give little thought to hoses breaking or handles separating. One documented incident involves a Shell station in Germany. The Shell station performed as designed, the customer and the surrounding individuals did not. These events are unforeseen, and can cause fires, burns, loss of life and massive destruction. The Shell incident as it occurred:

A woman pulled into a hydrogen fueling station. She got out of the car to purchase a beverage at the station. The passenger in the other seat moved to the driver's seat and initiated a fill by inserting the filling nozzle to the vehicle fuel receptacle. He then moved back to the passenger seat. The woman approached the car, go in, assumed the fill was complete because her fellow traveler was back in the passenger seat and drove away. She was unaware that the fill was in process, and the hydrogen handle was still attached to the vehicle. The hose separated from the handle, sprayed hydrogen, which did not injure anyone, fortunately. Three individuals ran to her car each trying to remove the fueling handle. Each suffered a severe burn from the cold metal. They were unaware that the handle being attached was not a grave danger, nor were they aware of the cold temperature the handle became due to the separation. Three ambulances came to ferry each panicked bystander to receive wound care. This disclosed vehicle indicator addresses human error, based on a need for immediate action in a clearly defined way at the time of the incident.

Disclosed herein are devices, systems, methods and products that address many of the challenges posed by hydrogen fueling dispenser and vehicle indicators, to inform of status, safety and malfunctioning states. The indicators can be visual and/or acoustical, and may be sent to user's mobile phones, and station operators. The status alerts can also be sent wired or wirelessly to remote locations, like the fire department or other emergency services. If there is a malfunction that can affect the entire station, putting others in harm's way. The indicators can be visible and, and or acoustical, and used to "cordon off an area" or alert vehicles wishing to enter the station or surrounding area to not enter.

Additionally, disclosed herein is a status indicator on the handle of the hydrogen dispenser. When hydrogen is flowing into the vehicle, the handle will illuminate to tell the user the hydrogen is filling the vehicle, and when the fill has been completed. It will also alert the user if there is a freezing situation, by means of a visual or audible indicator. Both the vehicle and hydrogen dispenser may have temperature sensors to facilitate the indicators. The freezing alert will also warn individuals in the area, not to touch the nozzle or vehicle connector due to the extreme temperature, which could cause severe thermal injuries to individuals. The "illuminated" area on the handle will also inform users that the cold hydrogen is flowing into the vehicle's tank. The illuminated area can have color coding, meaning, for example, Green=Ready, Blue flashing=Filling, Blue solid=Fill is complete, Red=malfunction. The same colors and or illuminated symbols can be located in the area of the vehicle's connection device, or on or near the fueling door, that receives the hydrogen from the handle. Currently that area is covered by a fueling door, but future vehicles are not bound to any specific placement on a vehicle. Meaning, the fill point (receptacle) may be on the side, front, back or underneath the vehicle. If the fill is from underneath the vehicle, the vehicle alert system can be positioned above the driver's door handle, or on the instrument panel, navigation screen, user's smartphone, etc. The alert can also be sent to the station's office, or to a remote location. An example would be a fire department, police department, or other first responders.

The illuminated area can also, additionally, or in lieu of the handle, be located around, adjacent, on the fill door, or anywhere on the vehicle itself, including the roof, sides, grille, bumper, GPS antenna, taillight or any surface that is a light conducting, or can produce a lighted area or areas. The illuminated area can also be illuminated by a projector type lens. The illuminated area can be one specific area or multiple areas, which can cover a 360-degree viewing area if one were to walk around the vehicle. The same illuminated area on the dispenser housing or any surface of it, that is a light conducting, or can produce a lighted area or areas, or have an illuminated area, symbol, line, flashing LEDs, or the light can simply be projected on to it. The illuminated area can be one specific area or multiple areas, which could cover a 360-degree viewing area if you were to walk around the vehicle.

The information can also be transmitted to other vehicles, with or without drivers. Autonomous vehicles may play a dominant role in the future, and at times the vehicle may be filled with occupants on board. A passenger in such a vehicle may need to wait for up to ten minutes for the vehicle to fill up. Passengers must be alerted to malfunctioning states of a vehicle, especially one that could cause a ten-minute delay, rendering the vehicle immobile. The status or malfunction situation can take the form of an alert in the in-cabin screen and or an audible alert, using a recorded voice or any other type of warning. The alert and accompanying instructions and other information can also be displayed on the rear-view mirror which is easy to see from the center rear seat, or even a display on the back of a headrest for rear passengers. The occupants must know where the accident is, and what is the safest way exit to safety, to avoid a fire or hydrogen venting situation. The indicator can take the form of an alert in the in-cabin screen and or an audible alert, using a recorded voice or any other type of warning. Vehicles will be connected via Bluetooth, Wi-Fi or IoT (The Internet of Things) or any other future communication methods. This system can be accessed remotely by emergency responders, to guide the occupants. For individual passengers, driver driven cars, the alert and guidance can appear on the IP (Instrument Panel), Navigation screen or in the "Head's Up" display. It will alert the driver as to how to exit the vehicle and the path to take, if it is safe to exit the vehicle. If it is not safe to exit the vehicle, the responders can communicate vocally, through an acoustical alert, or through any display system that they should remain in the vehicle, until rescued or it is safe to exit.

Vehicles may be connected via one or more of a variety of communication protocols including Bluetooth, Wi-Fi, and/or other communication protocols. This system can be accessed remotely by emergency responders, to guide the occupants. For individual passenger, driver driven cars, the alert and guidance can appear on the IP (Instrument Panel), Navigation screen or in the "Head's Up" display. It will alert the driver as to how to exit the vehicle and the path to take, if it is safe to exit the vehicle. If it is not safe to exit the vehicle, the responders can communicate vocally, through an acoustical alert, or through any display system, including the occupant's mobile phones and PDAs, that they should remain in the vehicle, until rescued or it is safe to exit. It can be an added feature, overlaying the current vehicle to remote center's parameters. It is new, useful and benefits passengers, the public and all first and secondary responders. The system can also alert drivers, passengers, first responders, etc., on their smartphones, or send out a tone like the known "Amber Alerts" or Emergency Notification built into smartphones today. Additionally, the status indicators can be visual and/or acoustical, and sent by any known means, today or in the future, such as for example, "Google Glass" or a similar "Head's Up" type message transmission into a normal looking pair of glasses. The emergency team can send the information directly to those who need guidance, warnings, or directions like a vehicle's navigation system. The path to safety can also be directly sent to the vehicle, in a navigation style message, or to the user's smartphone. It can open up Google Maps, and give the occupants, clear directions, seamlessly as they leave the vehicle, and have a portable, lighted path to safety. The emergency guidance can be programmed to turn the flashlight feature of the phone on, lighting the path below, while having the path on the screen of the phone. This can be done automatically, since during emergencies it may not be easy for those seeking safety to spend time opening the alert and turning on the flashlight feature. The goal is to clear the area as soon as possible, in the clearest and easiest way possible. The emergency team can send the information directly to those who need guidance, warnings, or directions like a vehicle's navigation system. The path to safety can also be directly sent to the vehicle, in a navigation style message, or to the user's smartphone. The emergency guidance can be programmed to turn the flashlight feature of the phone on, lighting the path below, and by doing that will make themselves visible to anyone in the surrounding area. They turn into a trackable person who may need assistance. This can be done automatically, since during emergencies it may not be easy for those seeking safety to spend time opening the alert and turning on the flashlight feature. The goal is to clear the area as soon as possible, in the clearest and easiest way possible. The visual and or acoustical status indicators can alert of a breakaway situation. If the hose becomes separated from the filling handle, a whipping effect can occur, leaking the pre-cooled −40 to −50 C hydrogen, which can create multiple thermal injuries to drivers and all individuals in the vicinity.

Another alternative is to have the visual indicator on the roof, for example by the GPS antenna or area on the rear portion or front portion of the roof. In some vehicles, like the GMC Yukon, the GPS antenna is on the roof of the vehicle just above the windshield. The GPS antenna, which in BMWs for example looks like a shark's fin, at the rear of the top of the roof, located near the rear window. The "shark's fin" is raised, visible, and it has wires going from the car's electronics going to it. Adding a light is simple, it simply requires running an additional wire to the exterior "Shark's fin" and having a visible opening with an LED or bulb that is powered and visible. In pickup trucks, like the RAM 2500 a popular option is the clearance lamps. They are a series of small yellow illuminated areas above the windshield. These clearance lamps can serve the dual function as described to present visual indicators. Rarely are roofs destroyed in common car crashes. The back, front and sides are the most common areas of impact. The roof is only affected in a roll over situation or where a car would underride a truck's rear trailer. Those incidents are a miniscule fraction of all vehicular accidents. Trucks or truck trailer lights are positioned at the top of the cab and the trailer. The visual indicator in this position has the clear advantage of being seen from any vantage point. It offers 360% coverage. A retrofitted system can easily be achieved with vehicles that already have the illuminated clearance lights. In one embodiment, the amber light can be reprogrammed to add a flashing mode, to indicate a malfunction or dangerous situation. The amber light can be reprogrammed to add a flashing mode, to indicate a malfunction or dangerous situation, or replaced to enhance visibility and add different colors to make the status of the vehicle better understood. Meaning during the day, these clearance lights are usually not on and are turned on at nighttime. In the disclosed embodiment, the clearance lights can be turned on, even during the day, to transmit status. The result is taking a pre-wired, illuminated area that is not in use, during the day, and making it useful for an added purpose.

If FCEVs and non-traditional gasoline powered vehicles can prove their safety, the whole non-traditional gasoline powered vehicles segment can grow. Autonomous vehicles may become a significant portion of the segment and they may be powered by hydrogen or non-traditional gasoline powered vehicles. The same safety measures must be enacted, even if there is not a traditional driver. That is irrelevant for many safety situations, meaning the autonomous vehicle is designed to carry passengers.

During hydrogen fueling, if the nozzle become frozen to the vehicle during a fill, the driver needs to know when it is thawed. The driver can then remain in the vehicle until the warning symbol/visual indicator and or sound component alerts the driver, they can exit the vehicle and remove the filling handle. Or if the driver goes into the station's store area, they will be able to see by a light on the dispenser and or a light on the vehicle alerting them of the frozen situation, and when it is safe to remove the handle from the vehicle. The customer may be able to remove an object from the dispenser, which will alert the customer when the vehicle is "thawed" meaning it is safe to return to the vehicle, to disconnect the handle from the vehicle. The driver/customers have the opportunity to remain safely in the vehicle, or exit the vehicle to use the facilities, get coffee or stay inside by the attendant's area, in a store or service area. This also is an advantage when a user's mobile phone is not fully charged, or the smart watch lacks power and will not function. The customer (s) may also go anywhere in the vicinity of the station, since the thaw could take up to ten minutes. The removable device allows them to be notified, that it is safe to return to the vehicle and exit the station. This device also can alert the customers of any other danger in the station, such as a fire, and alert them minutes or hours later it is safe to return. This type of display screen may be part of the dispenser, and available to remove and replace if the customer does not have a cell phone. This system is in place in restaurants where a device is given to a customer, and the device lights up and vibrates indicating that the customer's order or table is ready.

While hydrogen as a fuel source has a number of advantages and is being implemented in consumer and commercial settings it poses a number of challenges. Being highly explosive, characterized by leakage issues, and requiring storage at extremely cold temperatures and/or high storage pressure however poses a number of dangers to vehicle users, first responders and the public in general. Gasoline has a distinct smell that anyone can detect, and be alerted of a leak, and potential fire or explosion. Hydrogen is odorless and colorless. Currently, odorants are not used with hydrogen because there are no known odorants light enough to "travel with" hydrogen at the same dispersion rate. Current odorants also can contaminate the HFC, leaving no way to "mark" hydrogen for identification due to a unique or known warning smell. So, if a tank which is designed to vent its hydrogen contents, does so in an enclosed area, there is no way to detect its presence. Hydrogen is a very small molecule with low viscosity; as a result, it is prone to leakage. Additionally, hydrogen gas is highly flammable and will burn in air at a very wide range of concentrations between 4% and 75% by volume. The mixture may be ignited by spark or heat, or static. Pure hydrogen-oxygen flames emit ultraviolet light and are invisible to the naked eye. As such, the detection of burning hydrogen requires a flame detector. Hydrogen is also colorless, odorless, and tasteless, which further makes detection of a leak impossible to detect, and upon ignition, the flames will be invisible, unless they mix with a contaminant such as burning plastic, rubber, debris etc. Liquid and gaseous hydrogen also tends to cause cracking (by causing embrittlement) in certain enclosures (such as tanks and hoses and fittings), particularly those made of metal. For hydrogen as a fuel source, many of the facts are from Sweden, because the USA has very few hydrogen vehicles and stations. The U.S. data is virtually non-existent concerning these described incidents in enclosed spaces, garages, and tunnels. The foregoing characteristics can present a grave danger to the public, responders, and to property. Professional first responders, and amateur good Samaritans who know nothing about vehicles but see an injured person or persons in a vehicle, will tend to run to the vehicle, and try to comfort, remove or assist. While admirable, these good Samaritans will tend to assume the vehicle is petroleum powered or will not think of the power source given the historic homogeneity of power sources and will therefore not appreciate the dangers of a non-gasoline vehicle.

As documented in Hydrogen Fuel Cell Engines and Related Technologies: Rev 0, Module 6, Fuel Cell Engine Safety, December 2001 (pp. 6-7) a radius of 1500 feet is suggested as the evacuation distance for an uncontrolled fuel cell vehicle fire. And guidelines all say to let a fire burn out concerning fuel cell vehicles, so the goal is controlled burn out, but that is not always possible. HFC vehicles are not placed in perfect controlled venting situations during fires. So, in essence they are all by nature uncontrolled fires. Additionally, fuel tanks for gasoline vehicles were traditionally made from metal, with great heat resistant qualities. Now, 98% of all European gasoline tanks are plastic. In the USA the figure is 75%. This contributes to all fire incidents, due to the low melting point of the plastic tank, which can contribute to the fire and or ignite vehicles in the vicinity as the fuel leaks out and burns.

If hydrogen vehicles are parked next to each other and battery vehicles during a fire, one can vent, which can cause the next vehicle to catch fire and vent. This can result in a never-ending chain of ignition. Additionally, a battery vehicle could spontaneously re-ignite and cause a nearby hydrogen vehicle to vent, adding new fires, which will spread to other flammable areas. It can be a "snowball down a hill effect, constantly growing as it moves."

In the future, the needs will increasingly likely contradict the prescribed methods of rescue. If there is a possibility of a hydrogen tank explosion, who do we minimize loss of life of? Do we evacuate up to 1500 feet from the potential explosion, leaving those trapped in a vehicle to perish, or do we send multiple first responders into the potential explosion, which could result in multiple fatalities which would be in addition to the trapped occupants. As discussed above, if we know a TPRD (Thermal Pressure Relief Device) is going to vent all the contents of a vehicle's tank, then we clearly have to eliminate any flammable materials from behind and to the side of the vehicle, so it can vent and potentially burn, shooting a jet stream of flames out and in an upward direction.

The examples below are a fraction of the possible situations. Hydrogen use in railway, truck, and maritime standards are also lacking, and these are emerging applications without safety protocols, due to their nascent standing. This means that if large ships are powered by hydrogen, fueling boats will dock alongside of them and fill them. These issues have not been addressed, because they are not scaled up. The embodiments disclosed here pertain to a variety of hydrogen filling stations, and the vehicles that use.

When you fill a HFC vehicle, you have to remove a small plastic cap, and after the fill you have to do the same. At night you may not be able to see it perfectly due to shadows. That nozzle can become so cold it could cause a thermal injury in seconds or skin could become frozen to it. Additionally, men with very large hands, or women with long fingernails may have issues taking off the nozzle and putting it back on, Vehicles and the refueling apparatus are typically designed with the average person in mind. Often, off-the shelf components are used instead of specially designed components which can render the usability less than optimal across a range of users, An HFC vehicle, as with any other non-petroleum powered vehicle employs what is to most people, a novel way to fill a vehicle. Moreover, even if a dealer explains to a new owner the details of refueling the vehicle, one of the owner's children or friends may borrow the vehicle. Also, if HFC vehicles are used as rental cars, that increases the chances of use by a person unfamiliar with the fueling practices and the possible dangers. Taken as a whole, HFC vehicles and all hydrogen powered equipment present an unknown quantity of differences and dangers which must be, and are not currently, properly addressed.

First responders face serious risks to their safety as they provide life-saving services. Each year, there are an estimated 46,000 crashes; 17,000 estimated people injured; and nearly 150 fatalities involving emergency response vehicles (ERVs), which include law enforcement, fire, and emergency medical services vehicles. The above data is historical and based on gasoline vehicles, not on the introduction of HFC vehicles and other alternative fueled vehicles.

Currently manufacturers have emergency response guides, which only point to small commonly known vehicle name plates, which are small, and identical to similarly named cars. These name plates typically appear on the rear of the vehicle above the bumper. For currently available vehicles the name plate may indicate the vehicle model as "Clarity" or "Accord". Such name plates may not be visible if there is no light, if the vehicle was hit from behind, or if another vehicle is parked directly behind it. Currently about 256 car names are used today. These names are constantly changing as names are added, and names are dropped. For example, in 2019 Hyundai introduced models named Palisade, Venue, Ioniq, in the USA. However, if you count a model like the Hyundai Tucson as a continuous model by name, that is true, however for 2020 the car looks completely different, yet retains the same name. That exacerbates the confusion for the quick identification of a vehicle. Concerning the 2020 Ioniq line, the same vehicle comes in three different variations. You can only tell the difference by the small name plate. The versions are: Ioniq Hybrid, Ioniq Electric, Ioniq plug in hybrid.

In certain embodiments, a display screen may be attached to the dispenser in a manner that it or another piece with wireless capability is removable by the customer who can then carry it while the vehicle is being refueled. The customer may then be alerted wirelessly of completion of refueling, or of an emergency situation.

In the disclosed embodiments, information may be transmitted wired or wirelessly (Bluetooth, Wi-Fi or IoT, etc.). The power source and "brain" then send out the acoustical and or visual alert to the sound producing component and the visual alert medium (laser, fiber optic line, LED, bulb, light guide, etc.). In certain embodiments, the visual alert medium may take the form of electroluminescent type paint, such as LumiLor® available from Darkside Scientific, Inc. In such embodiments, a paint type substance is applied to a surface an connected to a source of electrical energy which causes the surface to emit light when energized by electrical current.

It is vital that the public and responders evacuate an area if a venting of the tank will occur. The colors and sounds in the disclosed embodiments can be any hue, intensity, area covered or pitch (constant sound, beeping, intermittent, siren like, etc.). The system can also alert drivers, passengers, first responders, the public, etc. on their smartphones, or send out a tone like the known "Amber Alerts" or Emergency Notification built into smartphones today. The alerts may also be provided programmatically to navigation applications or other applications (such as Waze) to provide real time information, by way of text, icons, or other graphical or visual indicators that are automatically loaded onto, for example, a viewer's map.

The sound components of the system can be vital for those with visual impairments, or if a vehicle is in a danger mode, but visually blocked by another vehicle or obstacle. For example: a Toyota Murai FCEV type vehicle may be venting and about to cause a disastrous fire, but the warning light may not be visible if a large sport utility vehicle, is parked in front of it or to the side of it. This situation can also occur if the vehicle in question is parked on the side of a building or parked on a street when a delivery truck could block the ability to see the vehicle and it's light Vehicle to Vehicle (V2V) communication, can be employed to send a wireless signal from one vehicle to another, alerting of the danger. This technique makes the cars interact with each other, and provide additional safety warnings in a timely manner, potentially reducing loss of life, injury and destruction of property. A user, bystander or first responder does not have to witness the event, the car can broadcast the event and the status to other cars in the vicinity, which can set off a series of warnings. As cars become more connected, one car in the middle of a tunnel can send the signal to all of the cars in the tunnel and surrounding areas. This can greatly aid in determining the nature of the event(s). In certain embodiments, the light pattern and sound signature of the warnings can be transmitted to all vehicles, buildings, first responders in a predetermined radius.

In the following description, any indicator that requires power should be coupled to power in a manner to cause power to be supplied to the indicator even when power from the vehicle is off. This can be accomplished by way of connection to one or more power sources, including a local battery, to enable power to the indicator in the event that one or more power sources of the vehicle are inoperative. The disclosed embodiments may be realized by modifying a conventional hydrogen fueling station such as described in the following specification by the International Standard Organization, ISO/DIS 19880-2(en), Gaseous hydrogen—Fueling stations—Part 2: Dispensers (available at: https://www.iso.org/obp/ui/#iso:std: iso:19880:-2:dis:ed-1:v1:en). The terminology employed in the foregoing ISO standard is reproduced in Exhibit A, which is hereby incorporated by reference.

The disclosed embodiments may be better understood by way of the accompanying figures which are described below with reference to the designated alphabetical references in the figures.

The visual indications in the drawings represent both the freeze and thaw situations, as well as a "safe" alert or a "danger" alert. They also represent updated instructions in real time. They are not static, and do not represent finite displays. They are just for example and can display other images, words and combinations thereof.

FIG. 1 is a view of a first embodiment of a hydrogen fueling assembly 100 and receptacle 102 that operates to provide information regarding fueling status. The fueling dispenser assembly 100 in one embodiment illuminates green for a thaw or safe situation and red for a freeze situation. In other embodiments, any desired letters, symbols or lights may be used, or in any combination to provide information regarding fueling status. The receptacle 102 includes one or more visual indicators 104 located around the filling area or connection area on the vehicle. Other visual indicators 105, 106, 107 may be positioned near the area of contact to the receptacle 102 by the assembly 100. Moving to the assembly 100, a visual indicator 108 may be positioned at the top portion of the assembly 100 and the indicator 108 may take the form of a screen that provides a visual indication by way of words or characters. Another, or in lieu of, indicator 109 is positioned at the top portion of the assembly 100 closer to the user's hand. This may be a screen that indicates words or characters. A visual indicator 110 may be positioned at the bottom of the assembly 100 and/or 111 at the end of the assembly 100. A visual indicator 112 may be positioned at the end of the assembly 100 closest to the nozzle that contacts the receptacle 102. Moving to the other end of the assembly 100, a visual indicator 113 may be positioned on a hose 114 which provides hydrogen via the assembly 100 to the receptacle 102. The visual indicator 113 may take the form of a line or a series of dots or a skin that makes the whole hose 114 illuminate. One or more other indicators 115 may be similarly positioned on the hose 114 at various positions along the hose. The various visual indicators described above may be employed in different combinations in different embodiments. As noted above the indicators may be color coded to provide a visual indication of fueling status and/or may blink or flash to provide a visual indication of fueling status. Certain of the visual indicators may provide an image and/or text to provide a visual indication of fueling status.

FIG. 1 shows one example of a hydrogen fueling assembly 100. Other examples are shown in FIGS. 2-5. As can be seen, the various fueling assemblies shown can take a variety of forms. In general, they will supply hydrogen by way of a fueling hose, such as 114 that supplies hydrogen that is dispensed by way of a nozzle, shown generally at 120. The fueling assembly 100 includes a grip area shown generally at 122 that takes a form to enable the fueling assembly 100 to be grasped by a person's hand. The grip area is typically comprised of a type of plastic that provides some thermal protection. The assembly 100 also includes an area termed a "body" 124 herein which generally comprises various portions of the assembly other than the grip area 122. The body 124 includes an upper portion and side portions. As shown the assembly 100 includes an upper portion located at the top of the body 124 and side portions located at each side of the body 124.

Figure 2:
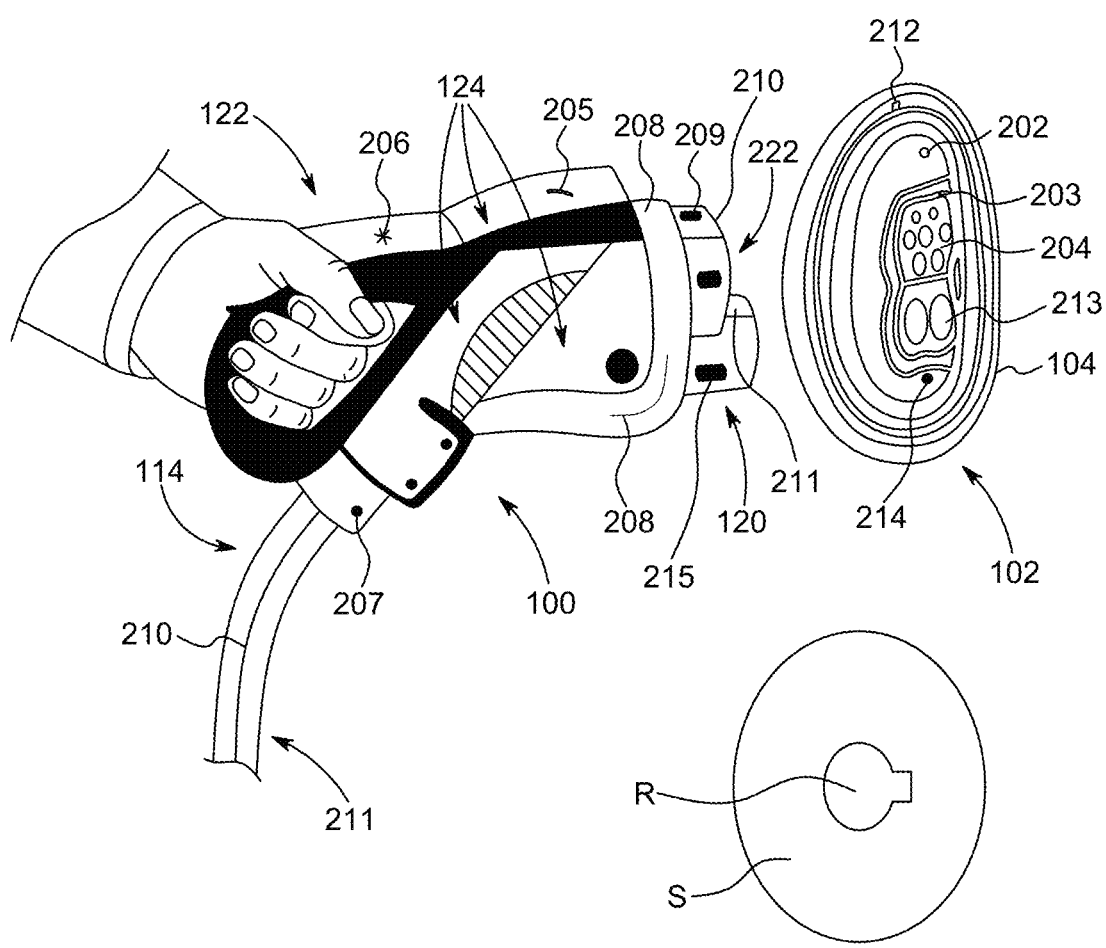
FIG. 2 is a view of an embodiment of a hydrogen fueling handle and receptacle showing positioning of sensor(s) on the fueling dispenser handle and fueling receptacle of FIG. 1.

FIG. 2 is a view of an embodiment of a hydrogen fueling handle and receptacle showing positioning of sensor(s) on the fueling dispenser's assembly 100 and fueling receptacle 102 on a vehicle. One or more sensors may be positioned in various combinations at the positions shown in FIG. 2 to sense temperature to provide the visual indicators in FIG. 1, and other indicators described herein with an indication of fueling status including conditions that may be harmful to the individual operating the assembly 100 and/or to others in the vicinity of the individual. Sensors may be positioned on the receptacle at various locations such as a sensor 202 around the filling area or connection area on the vehicle, one or more sensors 203, 204 positioned near the area of contact to the receptacle 102 by the assembly 100. A sensor 213 may be positioned near the perimeter of the opening in the receptacle 102 into which hydrogen flows or 214 further from the perimeter. A sensor 212 may also be positioned near the perimeter of the receptacle 102. Turning to the assembly 100, a sensor 205 may be positioned at the top portion of the assembly 100, a sensor 206 may be positioned at the top portion of the handle closer to the user's hand, a sensor 207 may be positioned at the bottom of the handle, a sensor 208 may be positioned at the end of the handle closest to the nozzle that contacts the receptacle 102. A sensor 209 may be positioned at the end of the assembly 100 closest to the nozzle that contacts the receptacle 102, a sensor 210 may be positioned on the nozzle 120. A sensor 211 may be positioned on the data interface area 222. Moving to the other end of the assembly 100, a sensor 210 and another sensor 211 may be positioned on hose 114 which provides hydrogen via the assembly 100 to the receptacle 102.

The sensors described in FIG. 2 and in the other drawings and elsewhere in this specification may in some embodiments be connected directly to one or more of the visual indicators shown in FIG. 1 and elsewhere in this specification. In such embodiments the sensor provides an electrical signal that causes a connected indicator to provide a visual indication as a function of the received electrical signal. An electrical signal in one range (e.g., a particular voltage range and/or current range) will cause one indication, for example that the temperature of the fueling assembly is within a safe range. Similarly, an electrical signal in a second range will cause a second indication, for example that the temperature of the fueling assembly is within a dangerous range. In other embodiments, more than two indications, each associated with a range of the received electrical signal may be employed. In certain embodiments, certain sensor(s) may be connected to one or a first set of visual indicators while other sensor(s) are connected to another or a second set of visual indicators. In certain embodiments, one or more of the sensors provides a signal to a microprocessor that processes the received signal and in turn provides a signal to one or more indicators (visual, audible) to provide an indication of fueling status including a safe and dangerous condition. Examples of such embodiments are shown in FIGS. 14, 15A-C, 16A-C and 17.

Figure 3:
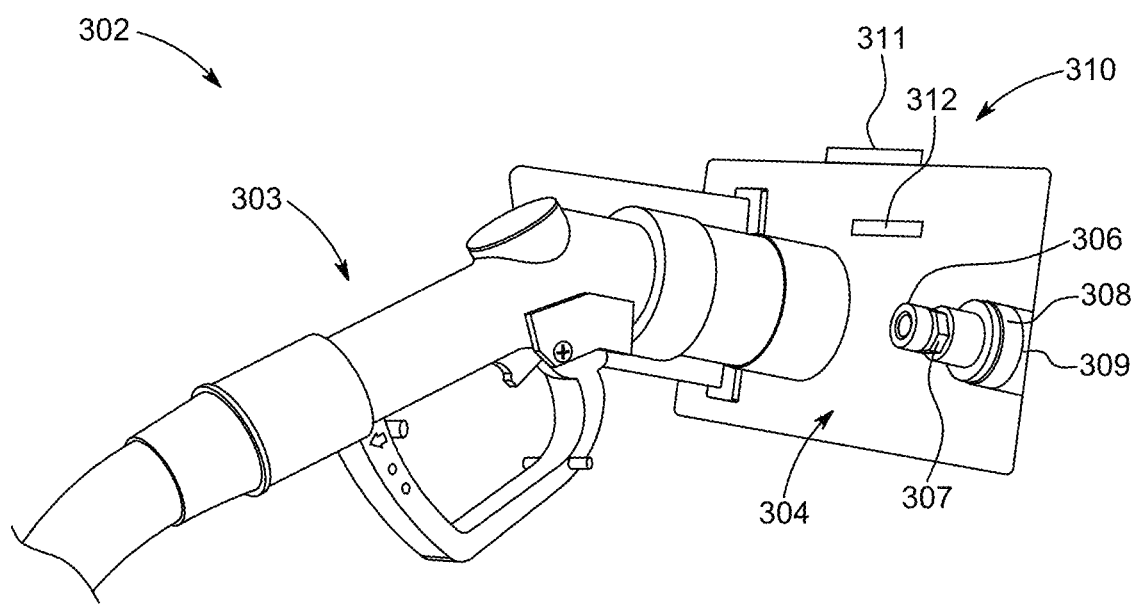
FIG. 3 is a view of an embodiment of a hydrogen fueling handle showing details of an embodiment of a vehicle with sensors and indicators.

FIG. 3 is a view of an embodiment of a hydrogen fueling handle showing details of an embodiment of a vehicle 302 with sensors and indicators with a fueling assembly 303 with recessed vehicle connector 304 and door (not shown). In the embodiment of FIG. 3, fueling receptacle 306 receives fuel from assembly 303. A sensor may be integrated into receptacle 306 or may be attached to receptacle 306. The assembly 303 securely attaches to the vehicle connector 304 by way of a clamp shown at 307. One or more sensors 308, 309 may be positioned at the base of receptacle 306. One or more sensors 310 may also be positioned elsewhere in the vehicle connector 304 and not on or integrated with the fueling receptacle 306. One or more visual displays 311 and 312 may be employed in the vehicle connector 304 to provide a visual indication of fueling status. In one embodiment the visual indication may be in red to indicate a dangerous situation, green color for normal filling, blue for a frozen state of the fuel through the assembly 303, and white when a frozen state ends to indicate to the user that the operator may safely detach the assembly 303 from the connector 304.

Figure 4:
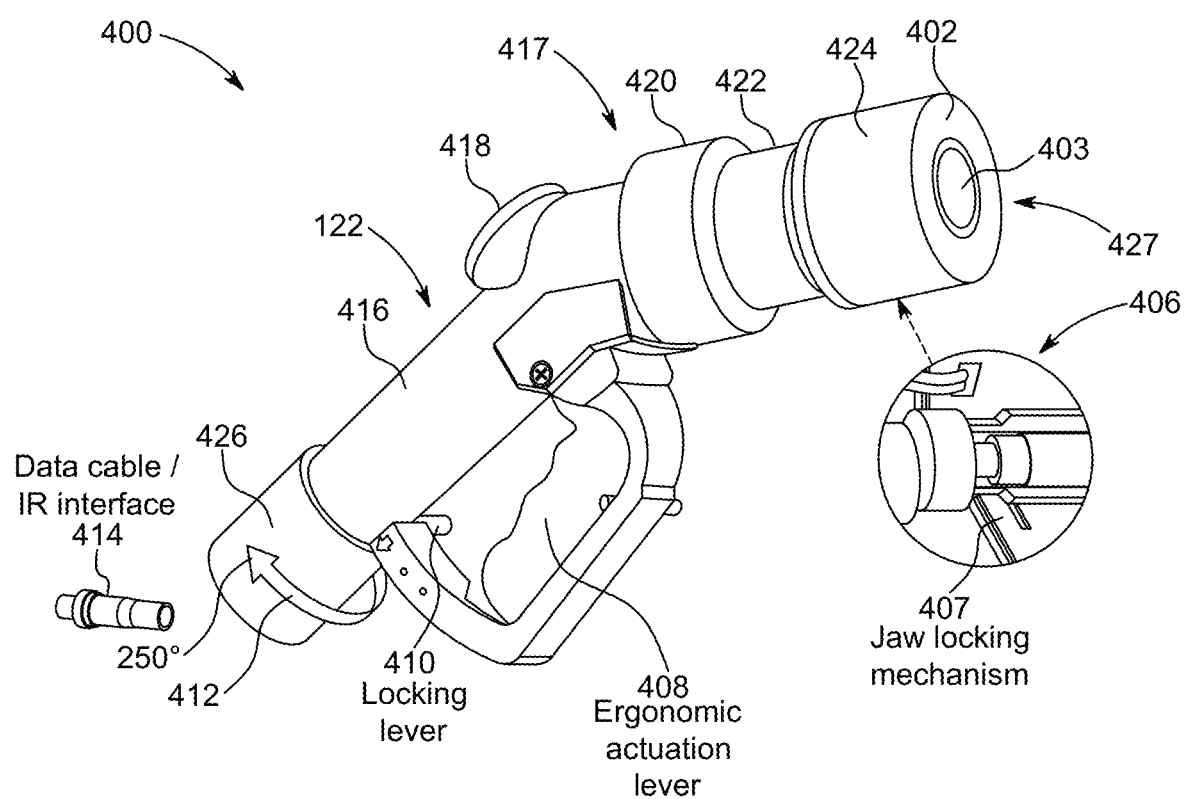
FIG. 4 is a view of an embodiment of a hydrogen fueling handle that operates to provide information regarding fueling status.

FIG. 4 is a side view of another embodiment of a hydrogen fueling assembly 400 that operates to provide information regarding fueling status. A sensor 402 may be positioned in the vicinity of the nozzle 427. In certain embodiments, this area may be used as an integrated interface for data transfer, according to SAE 12601. A sensor 403 may be positioned on the interior of the nozzle 427 through which fuel is transported. In certain embodiments, this area may be used for coding of pressure range and gas type. The assembly 400 employs a locking mechanism, seen in greater detail at 406 by which the assembly 400 securely attaches to a receptacle on a vehicle that is being fueled. In the embodiment shown, the locking mechanism takes the form of a jaw locking mechanism. The assembly 400 includes an actuation lever 408 to control the flow of fuel, a locking lever 410 to hold the lever 408 in an open position without pressure from the hand of an individual performing a fueling operation. In certain embodiments, the lever 408 may be equipped with one or more actuators to provide haptic feedback to a user as a warning. Also referred to sometimes as kinesthetic communication or 3D touch, haptics creates an experience of touch by applying forces, vibrations, or motions to the user. The assembly 400 may include an illuminated warning area 412 to provide a visual indication to a user of fueling status (normal, danger, etc.). The assembly 400 may also be equipped with a data cable or infrared (IR) interface by which information with a fueling station is exchanged. A grip area 416 may be equipped with a visual indicator to provide information on fueling status. In one embodiment, the visual indicator may take the form of integrated illumination which causes the grip area 416 to be illuminated in a manner to provide visual indication of fueling status. The grip area 416 is positioned at an obtuse angle relative to the body 417 and at a transition from the grip area 416 to the body 417 a visual indicator 418 may be positioned to provide an indication of fueling status. In other embodiments, other visual indications may be provided at other locations on the body 417 such as shown at 420, 422 and 424. One or more sensors may also be positioned at 426 on a rotatable cuff that permits rotation of the assembly 400 with respect to a hose (not shown) that connects the assembly 400 to a dispensing system. The sensor(s) may take the form of a temperature sensor with or without a humidity sensor, of varying forms including an IR sensor or sensors that map heat, or any type of thermal imaging or temperature imaging. A hose which connects the assembly 400 to a fueling station may be illuminated at portions to provide a visual indication of fueling status. The illumination may take the form of an illuminated spiral around the hose. Additionally, the hose may be wrapped in an illumination surface or jacket, or an electroluminescent paint as described elsewhere herein may be employed.

Figure 5:
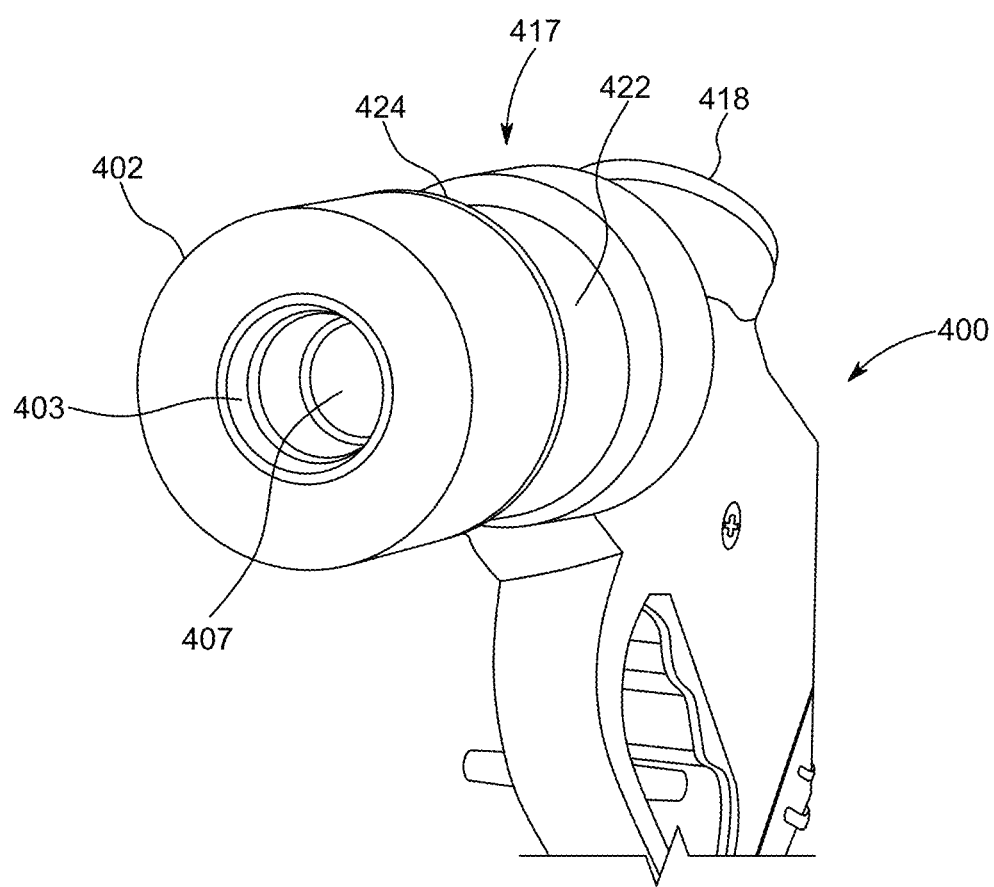
FIG. 5 is a view looking into the nozzle of the embodiment of the hydrogen fueling handle of FIG. 4.

FIG. 5 is a view looking into the nozzle of the embodiment of the hydrogen fueling handle of FIG. 4. The locking mechanism 407 in the interior of the fuel nozzle is shown as is the sensor 403 positioned within the fuel nozzle. The sensor 402 positioned on the end of the nozzle is shown along with the sensor 422 and 424 positioned on the body along with the visual indicator 418.

In certain of the foregoing embodiments, the nozzle area of the hose from the dispenser, clamps around a vehicle's fueling receptacle attachment area. The seal is secure, typically with metal-to-metal contact. Any metal can be measured for temperature, and a humidity sensor may be positioned in the area. That adds another layer of information for a configuration of a display of freezing, thawing and about to freeze situations. The information about a fueling event may be transmitted to the dispenser handle to alert the user. Meaning it may vibrate to alert of an undesired situation, or the alert may signal to terminate the fill, due to a potential freezing situation which could take up to ten minutes for a thaw, to safely disconnect the nozzle from the vehicle.

Figure 6:
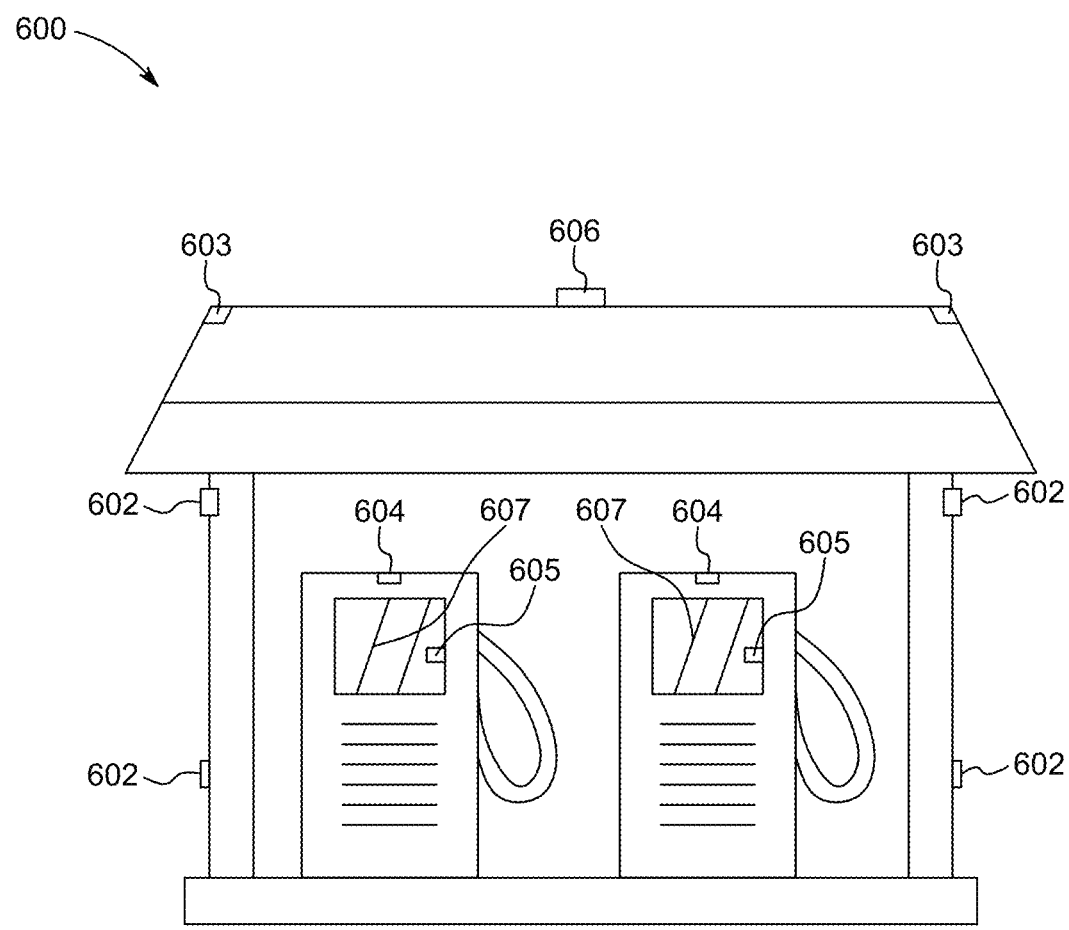
FIG. 6 is a side view of a hydrogen fueling dispenser island that operates to provide one or more of the indications disclosed herein.

FIG. 6 is a side view of a hydrogen fueling dispenser island 600 that operates to provide one or more of the indications disclosed herein. The embodiment of FIG. 6 operates to provide visual indication of fueling status in lieu of or in addition to the visual indication(s) provided on the fueling dispenser as described herein. The indicators on the island 600 operate to provide others in the vicinity of the island 600 with an indication of fueling status and in particular to provide a warning of a hazardous condition to cause such individuals to take safety precautions such as warning others and/or evacuating the area. The indicators may be positioned in a variety of areas on the island 600 including: 602—on the side of the island; 600, 603—at the top of the corner of the island; 600, 604—at the top of one or more of the dispensing systems in the island; 600, 605—on the display screen of one or more of the dispensing systems; 606—at the top of the island 600; and 607 at the top of the dispensing systems. The visual indicators receive indications of status directly from one or more sensors or from a computerized unit to provide the appropriate visual indication. The visual indicator 605 on the display screen of the dispenser.

Figure 7:
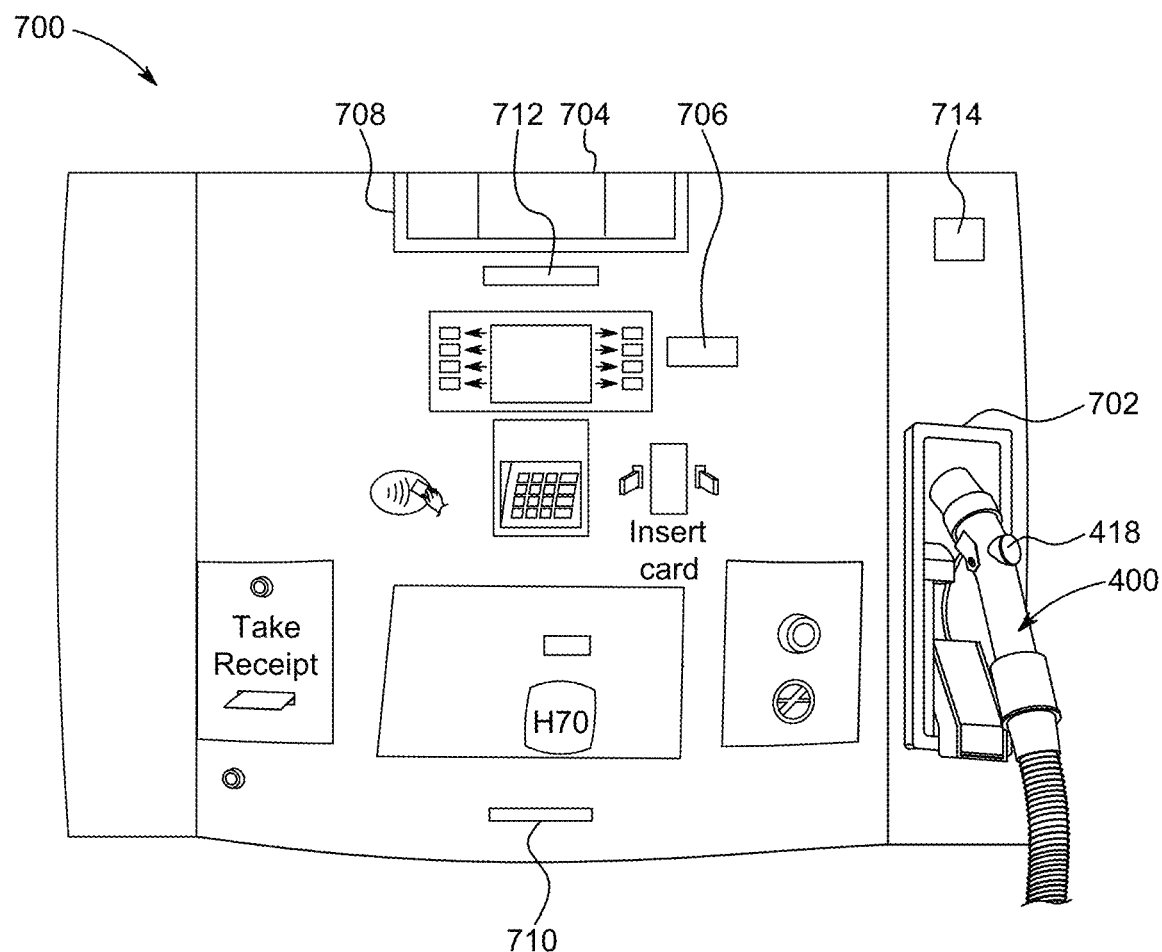
FIG. 7 is a close-up view hydrogen fueling dispenser.

FIG. 7 is a close-up view of a hydrogen fueling dispensing system 700. The visual indicator 418 as described above in connection with FIG. 4 is shown. A visual indicator 702 is positioned at the perimeter of the holding receptacle for the assembly 400. Such a visual indicator 702 can be useful in providing an indication to a user that it is safe to start fueling. Other indicators on the dispensing system 700 are positioned to provide a conspicuous visual and/or audible indication of fueling status. When fueling is being initiated by inserting or attaching the assembly 400 to a vehicle and when fueling is being terminated and sometimes when fueling is in operation, the user will be turned away from the dispensing system 700. In such instances, visual indications will be of limited use to the user but may be of use to others in the vicinity, including those in the vehicle being fueled. In such an instance, certain of the indicators shown in FIG. 7 may provide an audible indication to inform and/or alert the user, and others in the vicinity, of fueling status and of any hazardous condition. As seen, indicators 704 and 708 may be positioned on or in the vicinity of the fueling meter that indicates the amount of fuel delivered to the vehicle. Indicator 706 is positioned adjacent to a control area, comprised of a screen and control buttons, which can be used by the user to make selections pertaining to fueling of a vehicle. An indicator 710 is positioned on a lower portion of the dispensing system 700. Other indicators 712 and 714 may be positioned elsewhere on the dispensing system 700 such as approximately at user eye level in the vicinity of the fueling meter and above the holding receptacle.

Figure 8:
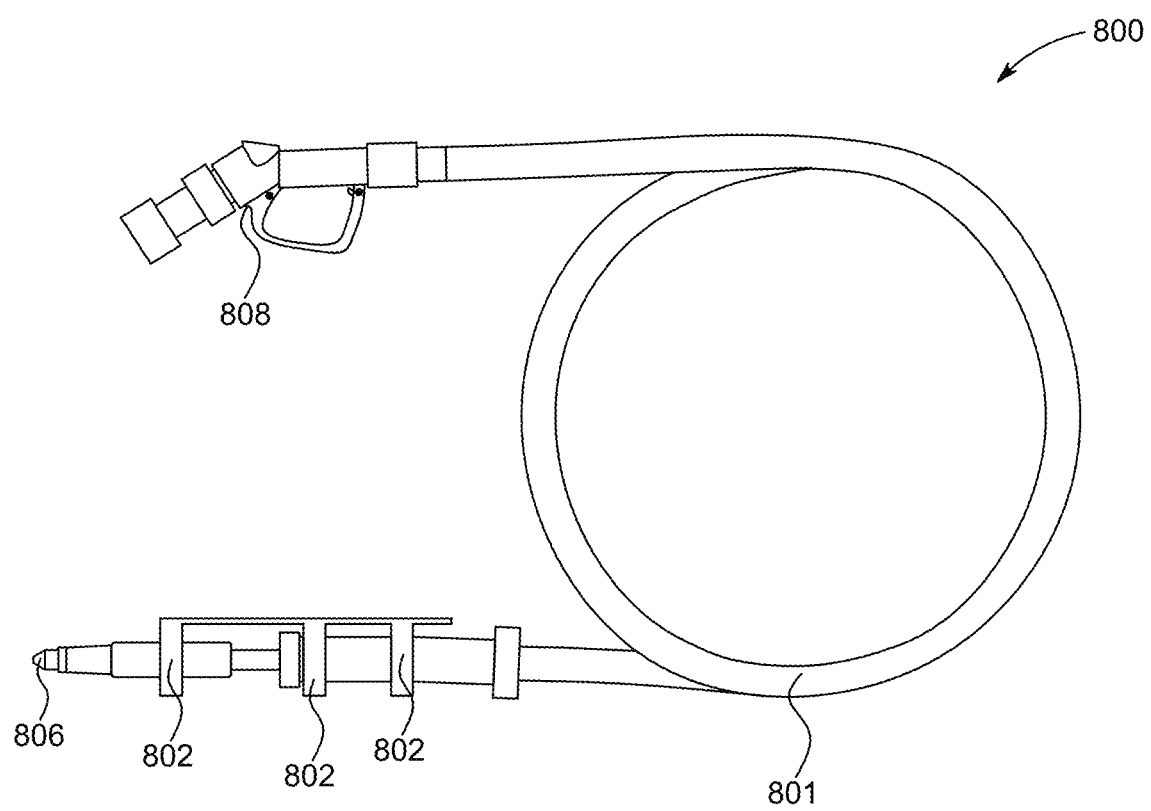
FIG. 8 is a view of a hose assembly that may be employed in a hydrogen fueling assembly.

FIG. 8 is a view of a hose assembly 800 that may be employed in a hydrogen fueling assembly. The hose assembly 800 includes a hose 801 and typically employs a breakaway device 802 that permits detaching of the hose 800 from the fuel dispenser if the hose is pulled away from the dispenser, such as when a vehicle is driven away without removal of the nozzle from the vehicle. A connector 806 connects the hose 801 to the fuel dispenser and can in certain embodiments include a data cable to permit data communication between the dispenser and components on the hose assembly such as sensors and indicators. Also seen is fueling nozzle 808 to attach to a vehicle to permit fuel to be provided to the vehicle. The fueling nozzle 808 may take a form such as shown in the embodiments of FIGS. 1-5.

Fueling status as sensed by the sensors described herein may be provided to the vehicle being fueled to provide occupants of the vehicle, the person performing the fueling and others in the vicinity of fueling status of the dispenser and hose assembly being employed and of the vehicle being fueled. The indicators may be positioned in various places on the vehicle being fueled and this is shown in FIGS. 9A, 9B, 9C, 10, 11, 12, 13, 14 for various types of vehicles.

Figure 9A:
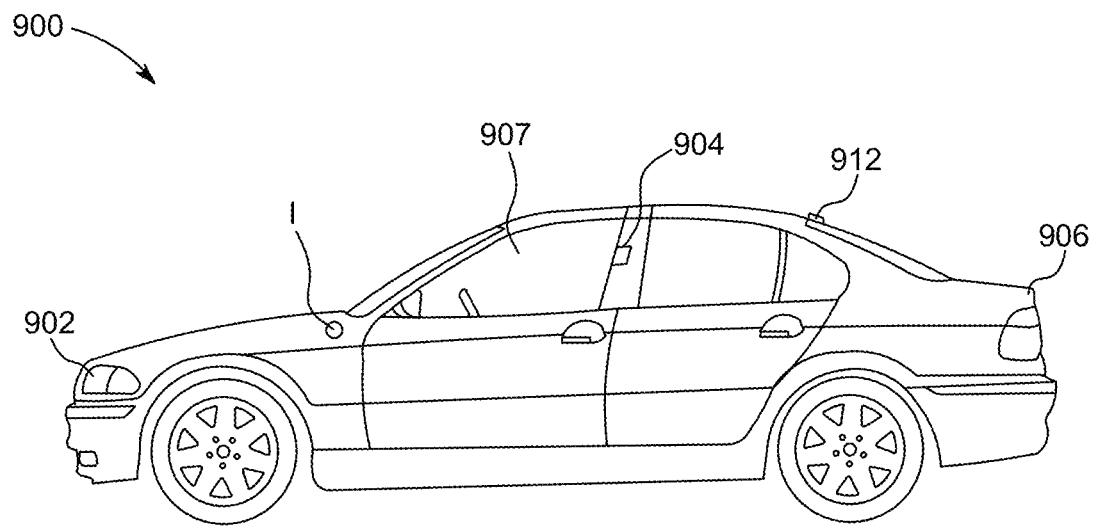
FIGS. 9A, 9B and 9C are respectively, a side view, front view and top view of an embodiment of a sedan type vehicle employing indicators of the type disclosed herein.
Figure 9B:
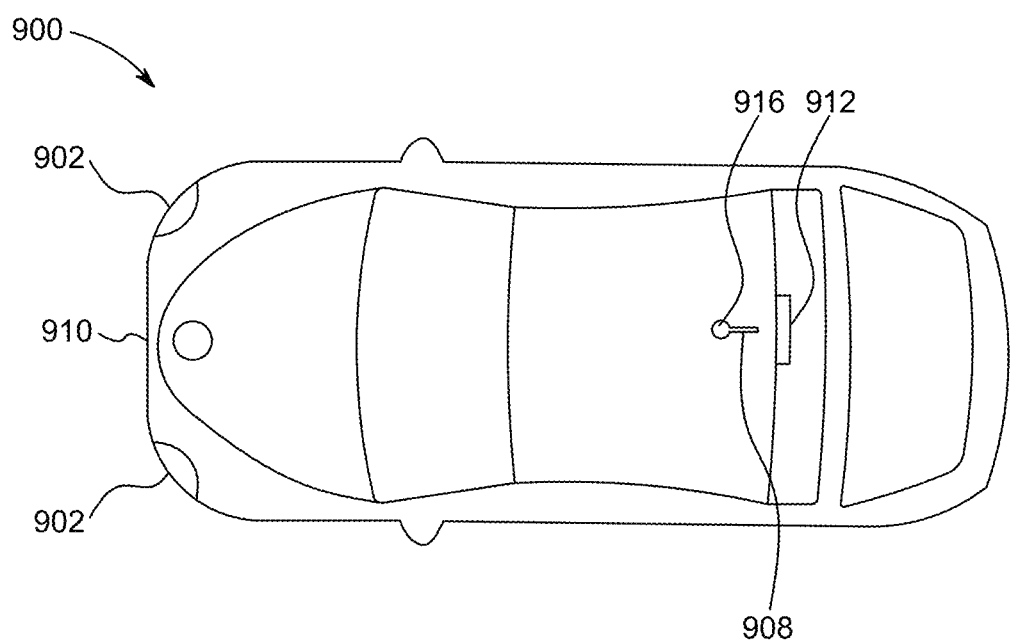
Figure 9C:
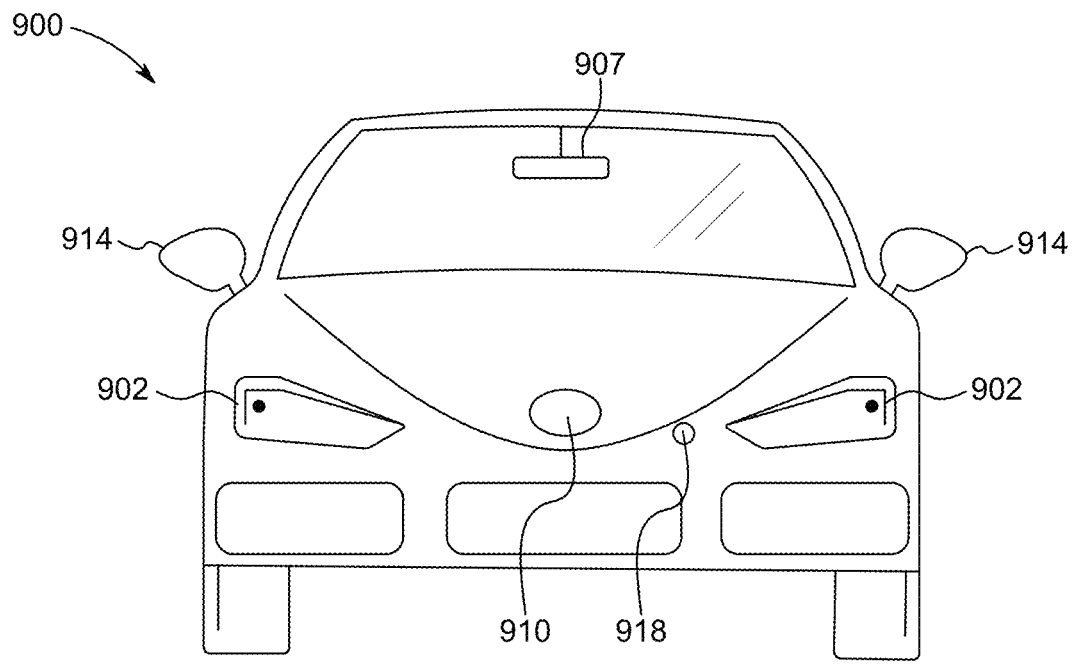

FIGS. 9A, 9B and 9C are respectively, a side view, front view and top view of an embodiment of a sedan type vehicle employing indicators of the type disclosed herein. The vehicle 900 has a visual indicator 902 positioned in the headlight housing, an indicator 904 in each B pillar and one or more indicators 906 in the taillight housing. The vehicle 900 also has an indicator 907 positioned in the rearview mirror, which may face the front as well as the cabin, to inform occupants. The vehicle 900 also has an indicator 908 positioned in the GPS roof mounted antenna area and an indicator 910 positioned where the manufacturer's badge may be, such as in the center of the hood toward the front edge, or in the vehicle's grill. Another indicator 912 is positioned in the third brake light mounted above the rear window and there is an indicator 914 on the exterior portion of each rear-view mirror. In some embodiments that use turn signal indicators in the side rear-view mirror the indicator 914 may be integral with the turn signal. A battery 916 is also employed to provide energy as a backup source in case of loss of power from the main vehicle battery and/or motor. A horn 918 or acoustic indicator may provide a distinctive tone such as three short beeps followed by three long beeps.

Figure 10:
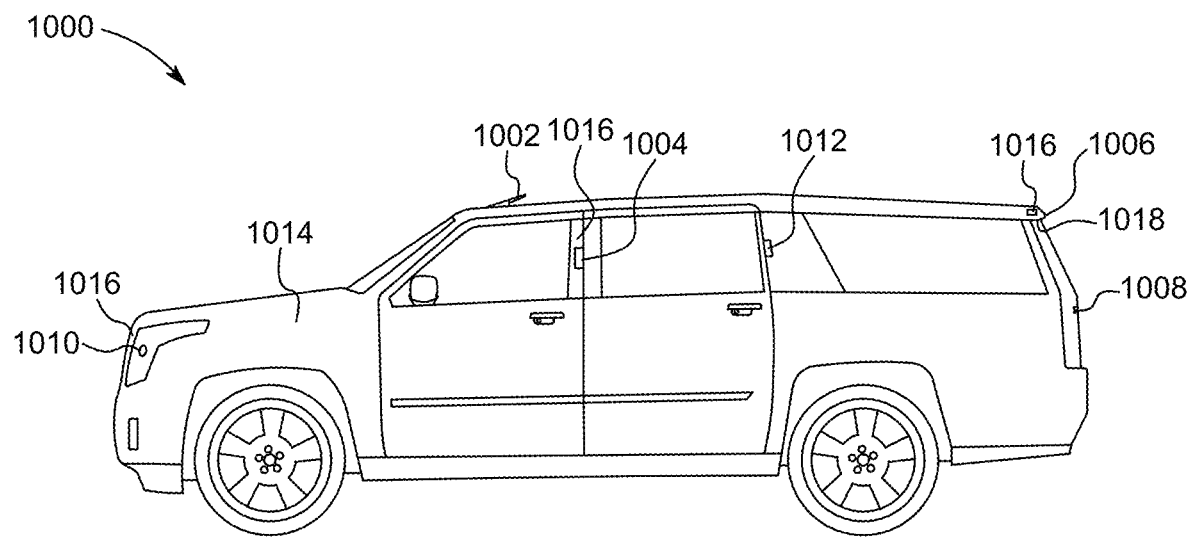
FIG. 10 is a view of an embodiment of a Sport Utility Vehicle (SUV) employing indicators of the type disclosed herein.

FIG. 10 shows a view of an exemplary Sport Utility Vehicle (SUV) 1000 employing indicators of the type disclosed herein. A visual indicator 1002 is located on the GPS antenna which is mounted on the roof of the vehicle toward the front in the vicinity of the windshield. Another indicator 1004 is positioned at the B pillar of the vehicle 1000. This offers the advantage of the indicator being in the same area as the driver's head. Another indicator 1006 is positioned at the rear of the vehicle toward the upper area of the rear window, and in certain embodiments near the area where the roof of the vehicle meets the tailgate/rear window area. In some embodiments the indicator 1006 may be positioned upon or within the third brake light area. The indicator 1006 may take the form of an Organic Light Emitting Diode (OLED) painted surface, anywhere on the structure, to allow it to light up in any color. In such an embodiment, the entire painted surface may light up in any way, shape, color, or pattern or a combination thereof. Another indicator 1008 is positioned in or around the taillight area. Another indicator 1010 is positioned in or around the headlight area. In a larger SUV such as the SUV 1000 which may have three rows of seats, the C pillar may have an associated indicator 1012, near the rear occupant's head. This provides a secondary alert zone, where passengers may be in the vehicle. A battery 1014 is also employed to provide energy as a backup source in case of loss of power from the main vehicle battery and/or motor. A horn 1016 or acoustic indicator may provide a distinctive tone such as three short beeps followed by three long beeps. A visual indicator 1018 may be located in the third brake light.

Figure 11:
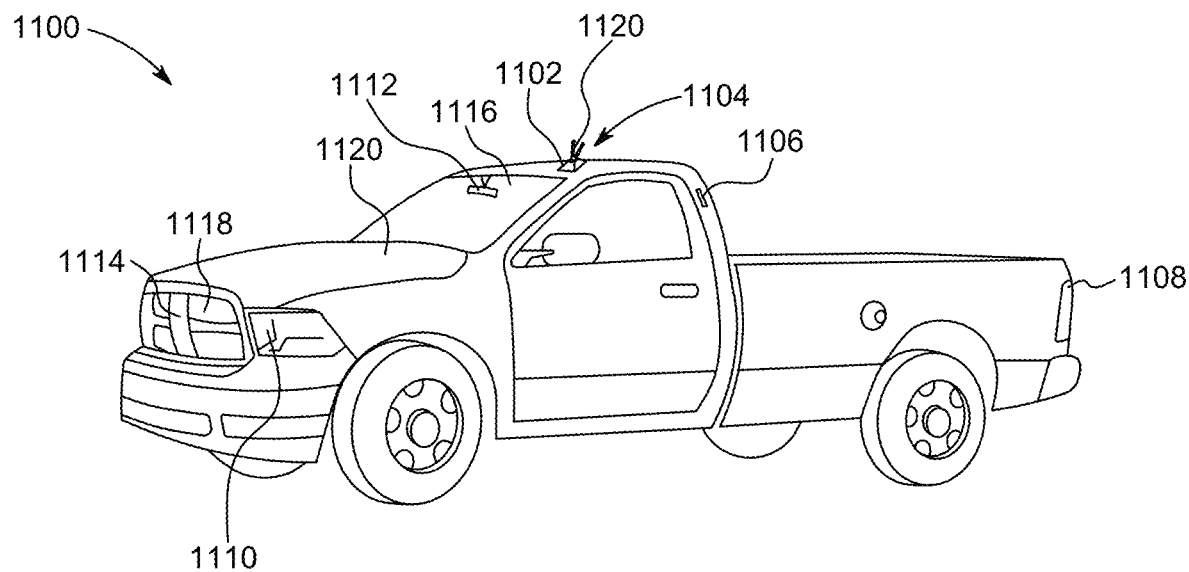
FIG. 11 is a view of an exemplary pickup truck employing indicators of the type disclosed herein.

FIG. 11 shows a view of an exemplary pickup truck 1100 employing indicators of the type disclosed herein. An indicator 1102 is positioned on the top, side or any area of a GPS roof mounted antenna. By way of example, GM vehicles have their antennae in this position above the driver's head. Others like BMW have them at the rear of the roof. An indicator 1104 is positioned in the form of a light at the top of the antenna. An indicator 1106 is positioned at the "B" pillar of the truck. In the overwhelming majority of accidents this area is still intact, unlike the front or rear bumper. An indicator 1108 is positioned in the taillight housing. An indicator 1110 is positioned in the headlamp housing. An indicator 1112 is positioned on the reverse or front side of the rear-view mirror. This is another area that remains intact during crashes, and can warn those in front of the vehicle, and those in the cabin with different colored indicators. An indicator 1114 is positioned in the grille. An indicator 1116 is integrated with the vehicle's emergency communication system (such as "SOS" Onstar by General Motors), or any other external way of communicating with the vehicle. It may play a recorded message, may be a human operator or a general warning. The operator may give the passengers directions, and information. An indicator 1118 is also positioned in the front grill of the vehicle 1100.

Figure 12:
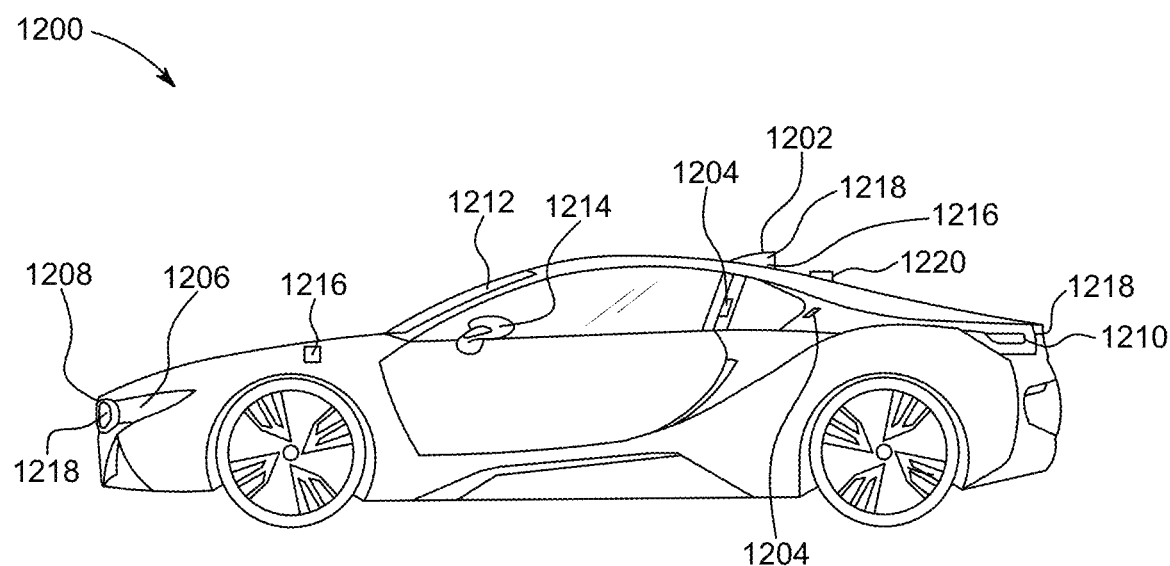
FIG. 12 is a view of an exemplary sports car employing indicators of the type disclosed herein.

FIG. 12 shows a view of an exemplary sports car 1200 employing indicators of the type disclosed herein. An indicator 1202 is positioned in the "shark's fin" GPS antenna on roof of the vehicle toward the rear of the vehicle near the upper region of the rear window. The indicator 1204 is positioned at each B pillar, an indicator 1206 is positioned in the headlamp area and an indictor 1208 is positioned in the front grille. An indicator 1210 is positioned in or around the tail lamp area and an indicator 1212 is positioned in on or around the rearview mirror which could be front or rear facing. The indicator 1210 may take the form of an Organic Light Emitting Diode (OLED) painted surface, anywhere on the structure, to allow it to light up in any color. In such an embodiment, the entire painted surface may light up in any way, shape, color, or pattern or a combination thereof. Also, an indicator 1214 is positioned on the outside area of the turn signal area on the rearview mirror. A battery 1216 is also employed to provide energy as a backup source in case of loss of power from the main vehicle battery and/or motor. Another visual indicator 1220 may be positioned in the third brake light of the vehicle.

Figure 13:
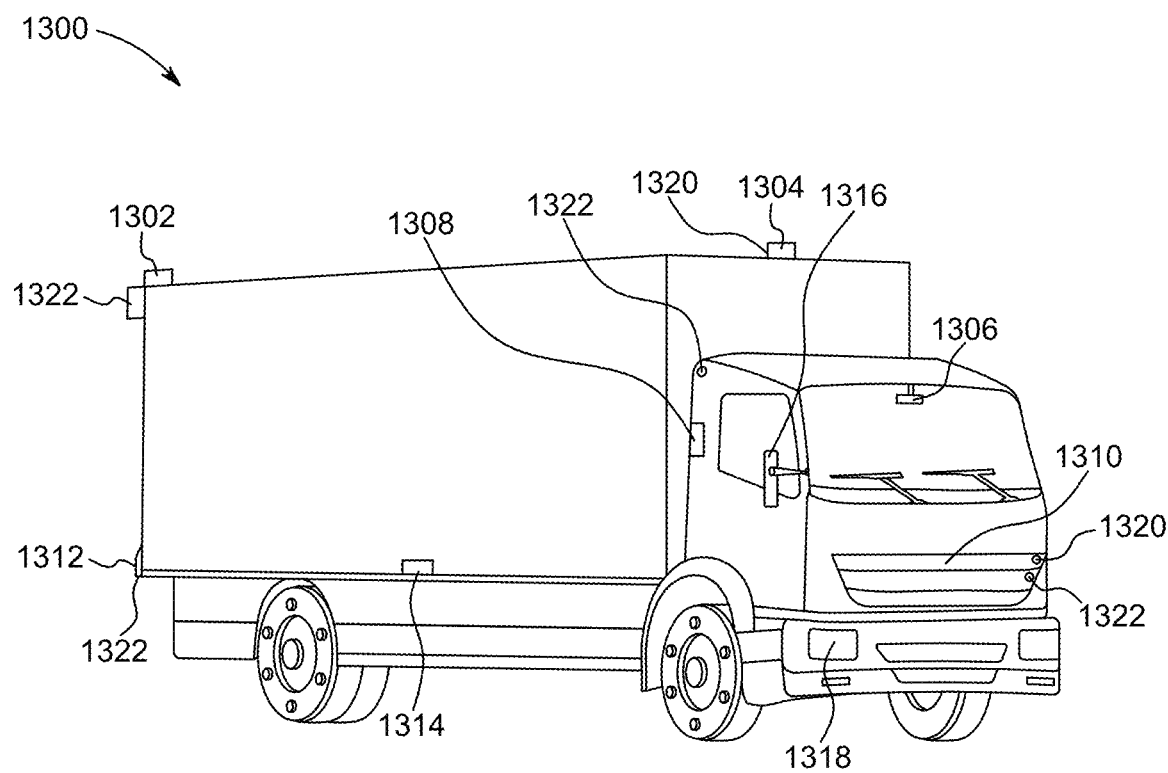
FIG. 13 is a view of an exemplary panel type truck employing indicators of the type disclosed herein.

FIG. 13 shows a view of an exemplary panel type truck 1300 employing indicators of the type disclosed herein. An indicator 1302 is positioned at the top of the truck in the rear and is either integrated with or is in the vicinity of the vehicle clearance light. The indicator 1302 may take the form of an Organic Light Emitting Diode (OLED) painted surface, anywhere on the structure, to allow it to light up in any color. In such an embodiment, the entire painted surface may light up in any way, shape, color, or pattern or a combination thereof. An indicator 1304 is positioned at the top front of the truck 1300 and is either integrated with or is in the vicinity of the vehicle clearance light. An indicator 1306 located on, around or in a rearview mirror. An indicator 1308 is positioned on the cab of the vehicle. Such vehicles may operate with only a cab, and not the box type storage container. An indicator 1310 is positioned in the front grille. An indicator 1312 is positioned at the rear by the loading platform. An indicator 1314 is positioned at each side of the vehicle and an indicator 1316 is positioned on each exterior side view mirror. Also, an indicator 1318 is positioned in the headlamp housing area or around it. A battery 1320 is also employed to provide energy as a backup source in case of loss of power from the main vehicle battery and/or motor. A horn 1322 or acoustic indicator may provide a distinctive tone such as three short beeps followed by three long beeps.

Figure 14:
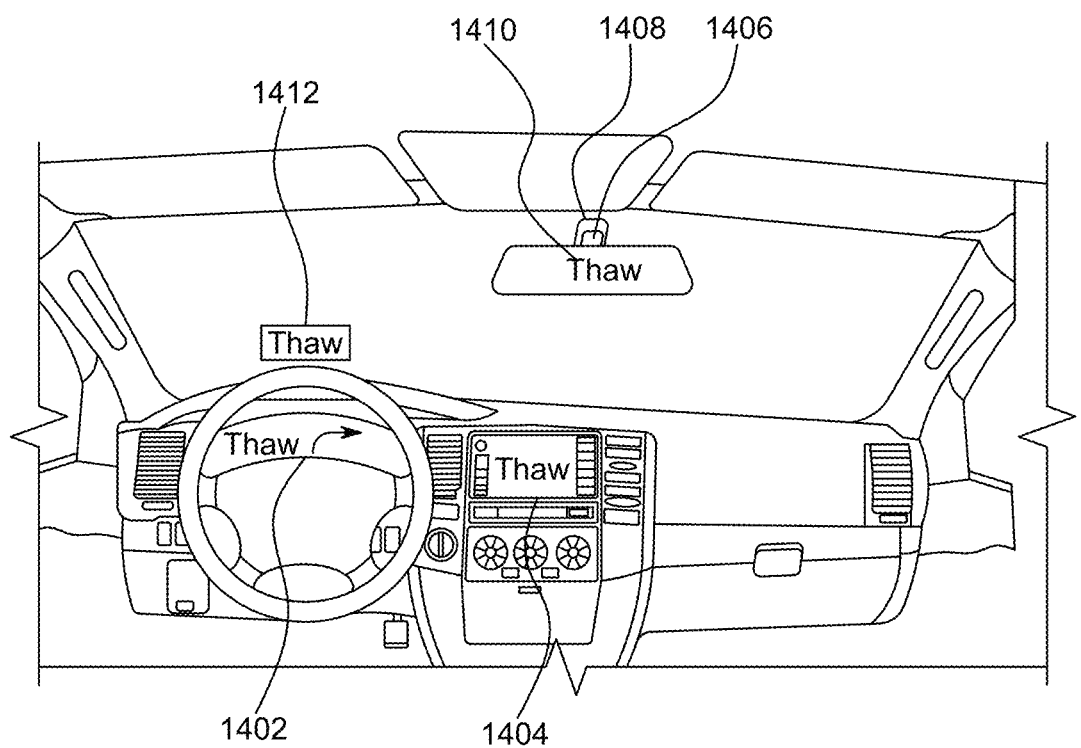
FIG. 14 is a front view of an exemplary dashboard (instrument panel) of a common vehicle employing indicators of the type disclosed herein.

FIG. 14 is a front view of an exemplary dashboard (instrument panel) 1400 of a common passenger type vehicle employing indicators of the type disclosed herein. The central display 1402 in front of the driver indicates the danger and the directions for the occupant. Meaning the danger and directions would be provided as described herein in connection with FIG. 16C. The navigation screen 1404 or the central display in front of the driver operates to indicate the danger and the directions for the occupant(s). An indicator 1406 is positioned in the rear-view mirror to also provide guidance to the user as to a dangerous situation. An indicator 1408 at the rear of the rear-view mirror, may also be used to be seen by those outside of the vehicle. The rearview mirror 1410 which is often not a true mirror but a display like a television. For example, the Infinity QX-80 displays the backup camera's image in it, when the cargo area of the vehicle blocks the view from a traditional mirror. This area can be used in the manner described in connection with FIG. 16C to provide instructions and other information to guide the user to safety. An indicator or message in the "Head's Up" display 1412 on a vehicle windshield may also be provided. The "Head's Up" is an optical image displayed from the dashboard of the car, which makes the image opaque in front of the driver. A battery (not shown) may also be employed as a backup source in case of loss of power from the regular power source to power at least the warning systems described in this paragraph. An acoustical indicator, which in one embodiment may take the form of a dedicated speaker (not shown), can operate to silence or override music or other audio emanating from the vehicle's regular speaker system. The speaker can operate to produce pre-determined warning tones in a unique way and in a unique placement.

Fueling status as sensed by the sensors described herein may be provided to computerized devices commonly used such as mobile phones, and wearables such as watches and glasses to inform various individuals such as occupants of the vehicle, the person performing the fueling and others in the vicinity of fueling status of the dispenser and hose assembly being employed and of the vehicle being fueled. Additionally, there can be a detachable device that operates in the manner described below that the end user can take into a safe area while they wait for the vehicle and nozzle to thaw. That will signal they can disconnect the nozzle safely and leave the station. This detachable device can work by Bluetooth or any wireless means. (e.g., cellular, Wi-Fi).

Figure 15A:
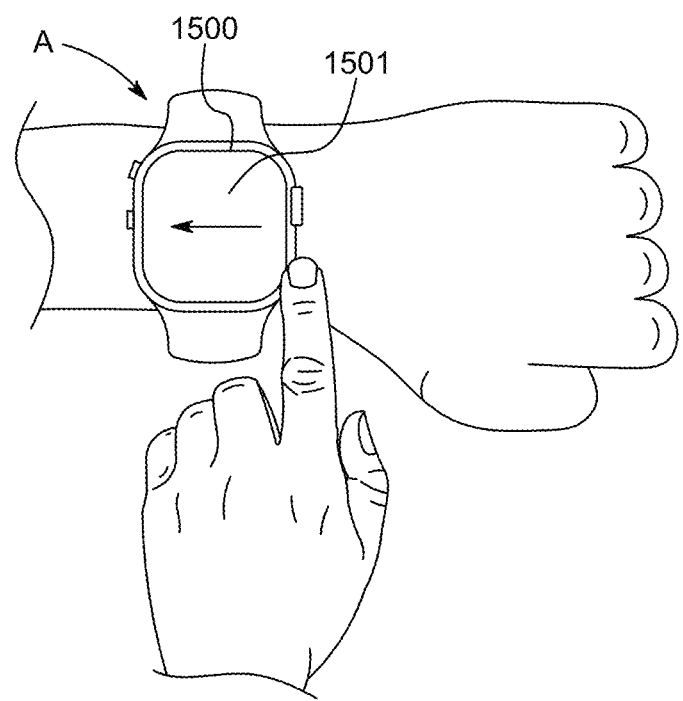
FIGS. 15A, 15B and 15C are views of a wearable computerized device that operates to provide indications of the type disclosed herein.
Figure 15B:
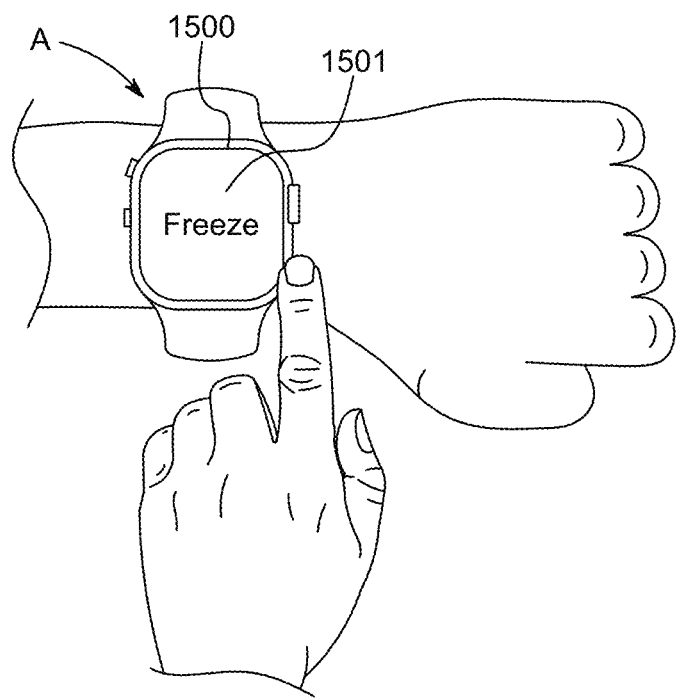
Figure 15C:
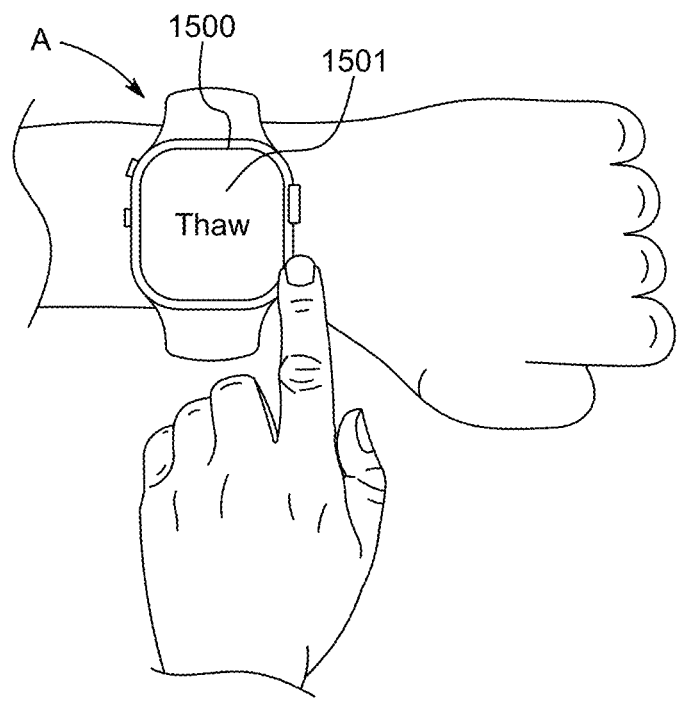

FIGS. 15A, 15B and 15C are views of a wearable computerized device that operates to provide indications of the type disclosed herein. Shown is a user's hand wearing a "Smartwatch" or wearable or other device 1500, such as the Galaxy Watch or Apple Watch. If the user is in the vicinity of an event that may put the user in danger, instructions are provided from a location remote to the user's device 1500 that cause control to be taken of the device's screen to provide instructions and other information to guide the user to safety. This can be done automatically or by swiping the screen, pushing a button or by any other means. The directions can be embedded with different lights to alert of the level of danger and "Waze" like characters like ambulances that are available for assistance. Thus, the embodiment of FIGS. 15A-15C provides safety to individuals by guiding them with indications and instructions by way of screen 1501 to stay away from a dangerous event and to guide them away from a dangerous event. The indications and instructions can include an acoustical indication by way of a speaker on the device, a visual indication such as a red warning light, which is a common symbol associated with danger. A vibratory alert may also be employed. As shown in FIG. 15A the user is controlling the device 1500 by way of interactions on the screen 1501. In FIG. 15B the user has been provided with an indication "Freeze" that indicates a freeze state in fueling of a vehicle such as a vehicle being fueled by the user or a freeze state of a fueling station that the user is about to use for fueling. In FIG. 15C the user has been provided with an indication "Thaw" that indicates the freeze state of FIG. 15B has ended and that the frozen state of the fueling apparatus has thawed to permit continued fueling or start of fueling.

Figure 16A:
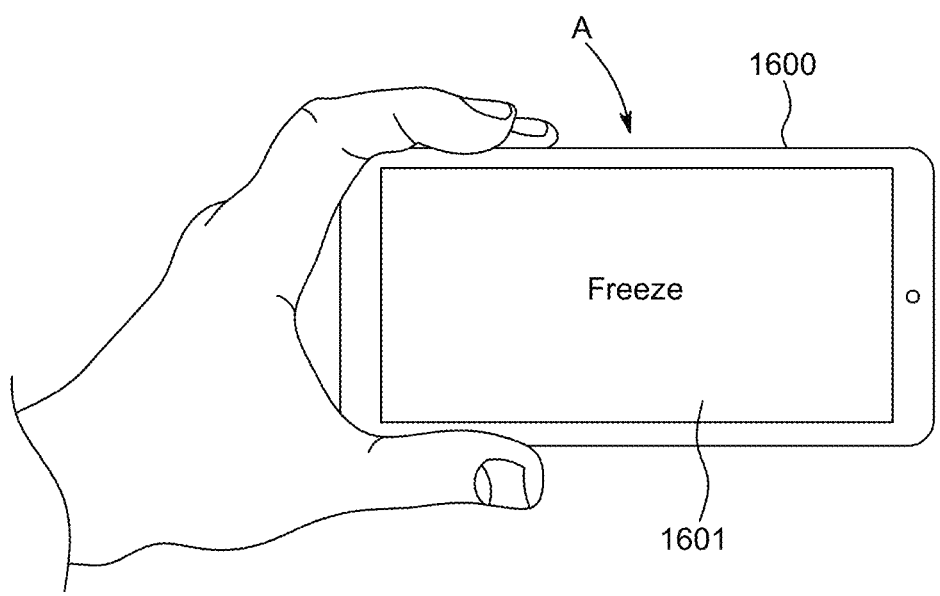
FIGS. 16A, 16B and 16C are views of a hand-held computerized device that operates to provide indications of the type disclosed herein.
Figure 16B:
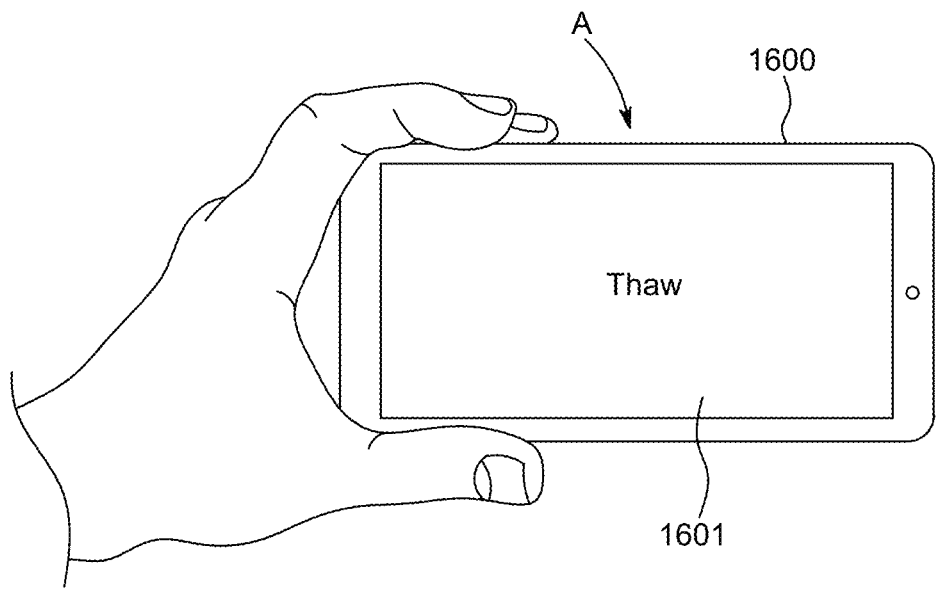
Figure 16C:
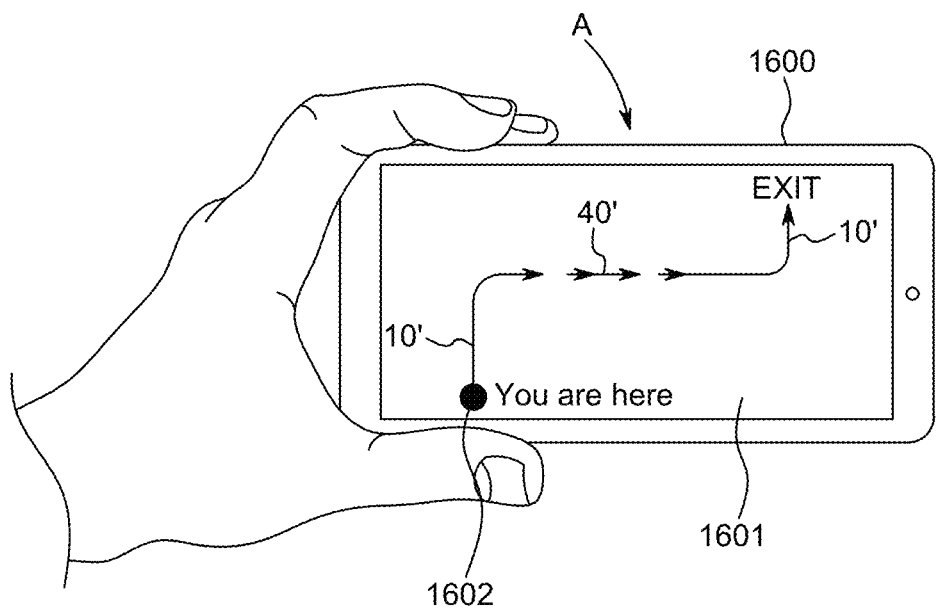

FIGS. 16A, 16B and 16C are views of a hand-held computerized device 1600 that operates to provide indications of the type disclosed herein including warnings, instructions and/or indications to a user with regard to an emergency situation. The screen 1601 is controlled during an event as described above in connection with FIGS. 15A-15C. The instructions to safety are immediately projected onto the screen 1601. At night or in dark situations, the rear facing flash on the device 1600 may be turned on to guide the user to safety, by illuminating the path. The device 1600 is programmed to provide turn by turn instructions, such as shown at 1602, which may be embedded with "Waze" like icons, to guide the user to safety. The screen also provides an indicator to indicate position of the user.

Figure 17:
FIG. 17 is a view of a wearable computerized device in the form of eyeglasses that operates to provide indications of the type disclosed herein.

FIG. 17 is a view of a wearable computerized device in the form of eyeglasses that operates to provide indications of the type disclosed herein. The glasses 1700 operate to project an image 1702 on the lens in a manner to be visible to the wearer. The information may only be visible during an alert or may be a constant stream of information. The indicator may provide instructions to safety, or status concerning the event. The information comes via WIFI, Bluetooth, cell transmission or by any other means, from the user's smartphone, or as the glasses acting independently. In one embodiment, a speaker may also be contained within the frame of the glasses. Additionally, a specific danger LED may be employed to provide a unique flash pattern in case of danger.

Aspects of certain of the embodiments herein can be implemented employing computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The terms "computer system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

Figure 18:
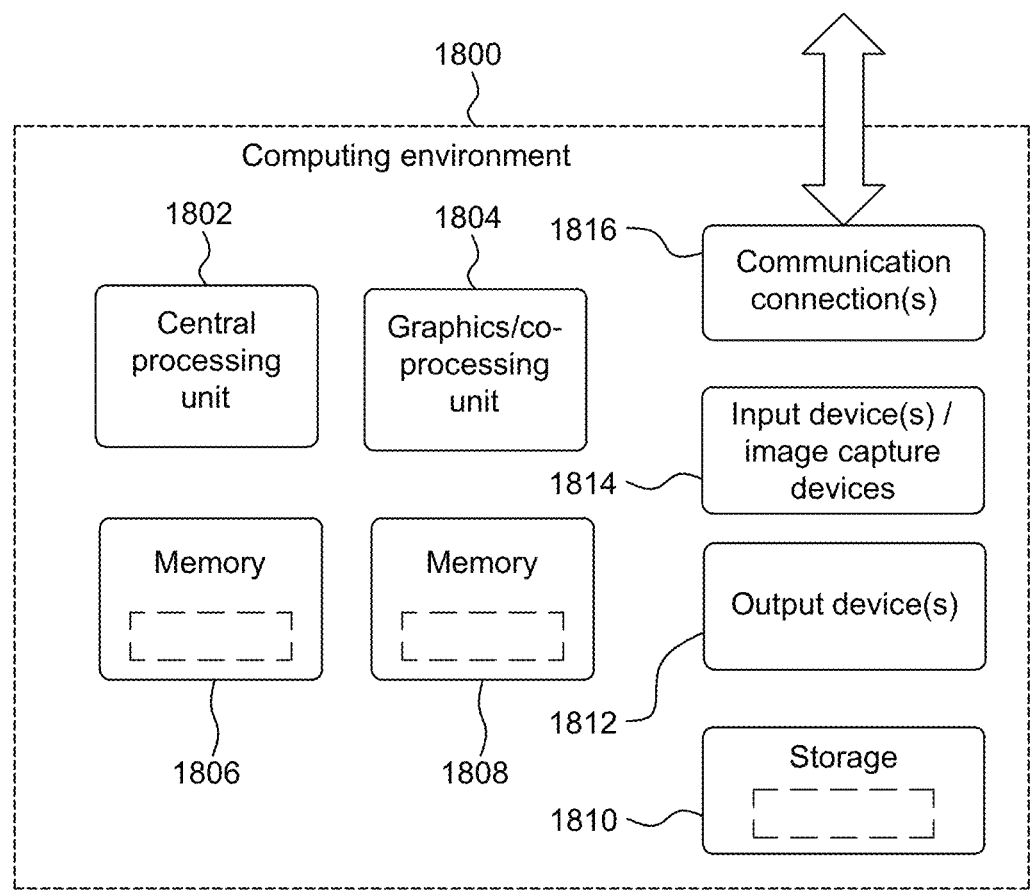
FIG. 18 is a block diagram of an exemplary computing environment that may be employed in implementing computerized aspects of the systems, methods and stored program modules described herein.

FIG. 18 illustrates a block diagram of hardware that may be employed in an implementation of the embodiments disclosed herein employing computer-executable instructions. FIG. 18 depicts a generalized example of a suitable general-purpose computing system 1800 in which the described innovations may be implemented in order to improve the processing speed and efficiency with which the computing system 1800 operates to perform the functions disclosed herein. With reference to FIG. 18 the computing system 1800 includes one or more processing units 1802, 1804 and memory 1806, 1808. The processing units 1802, 1806 execute computer-executable instructions. A processing unit can be a general-purpose central processing unit (CPU), processor in an application-specific integrated circuit (ASIC) or any other type of processor. The tangible memory 1806, 1808 may be volatile memory (e.g., registers, cache, RAM), non-volatile memory (e.g., ROM, EEPROM, flash memory, etc.), or some combination of the two, accessible by the processing unit(s). The hardware components in FIG. 18 may be standard hardware components, or alternatively, some embodiments may employ specialized hardware components to further increase the operating efficiency and speed with which the system 1800 operates. The various components of computing system 1800 may be rearranged in various embodiments, and some embodiments may not require nor include all of the above components, while other embodiments may include additional components, such as specialized processors and additional memory.

Computing system 1800 may have additional features such as for example, storage 1810, one or more input devices 1814, one or more output devices 1812, and one or more communication connections 1816. An interconnection mechanism (not shown) such as a bus, controller, or network interconnects the components of the computing system 1800. Typically, operating system software (not shown) provides an operating system for other software executing in the computing system 1800, and coordinates activities of the components of the computing system 1800.

The tangible storage 1810 may be removable or non-removable, and includes magnetic disks, magnetic tapes or cassettes, CD-ROMs, DVDs, or any other medium which can be used to store information in a non-transitory way, and which can be accessed within the computing system 1800. The storage 1810 stores instructions for the software implementing one or more innovations described herein.

The input device(s) 1814 may be a touch input device such as a keyboard, mouse, pen, or trackball, a voice input device, a scanning device, or another device that provides input to the computing system 1800. For video encoding, the input device(s) 1814 may be a camera, video card, TV tuner card, or similar device that accepts video input in analog or digital form, or a CD-ROM or CD-RW that reads video samples into the computing system 1800. The output device (s) 1812 may be a display, printer, speaker, CD-writer, or another device that provides output from the computing system 1800.

The communication connection(s) 1816 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with the disclosed embodiments, it is not intended to limit the scope of the invention to the particular form set forth, but on the contrary, it is intended to cover such alternatives, modifications, and equivalents as may be within the spirit and scope of the invention as defined by the appended claims.

Exhibit A
ISO/DIS 19880-2(en)
Gaseous hydrogen—Fueling stations—Part 2: Dispensers 3 Terms and Definitions For the purposes of this document, the following terms and definitions apply.
ISO and IEC maintain terminological databases for use in standardization at the following addresses:
- ISO Online browsing platform: available at http://www.iso.org/obp
- IEC Electropedia: available at http://www.electropedia.org/

3.1 Automatic Valve
valve that is self-actuated or remotely actuated by a control device 3.2 Breakaway Device
component installed upstream of the nozzle to shut off gas flow in the event of vehicle driving away while still connected to the dispenser 3.3 Component Pressure Rating maximum allowable pressure at which it is permissible to operate a component as specified by the manufacturer at a specified temperature
Note 1 to entry: Components designed to the Maximum Allowable Pressure under the European Pressure Equipment Directive have their component ratings by the manufacturer indicated by the value of "PS".
Note 2 to entry: Further guidance on dispenser pressure terminology and design rating is included in 19880-1.

3.4 Control System
system which responds to input signals from the process and/or from an operator and generates output signals causing the process to operate in the desired manner 3.5 Cv Value (Flow Coefficient)
coefficient to represent the flow rate of fluid that a valve is capable of handling
Note 1 to entry: Cv is the flow coefficient of a valve with the fluid at 15.56° C. under a pressure difference of 703 kg/m$^2$.
Note 2 to entry: There are different types of flow coefficients including Cv, Kv and Av.

3.6 Dispenser
parts of the pressurized-gas fueling station via which the pressurized gas is dispensed to vehicles
Note 1 to entry: As an example, the dispenser may include a dispenser housing, gas flow meter, a fueling hose and fueling nozzle attachments.

3.7 Dispensing System
system, downstream of the hydrogen storage, comprising all equipment necessary to carry out the vehicle fueling and protect against dispensing faults 3.8 Emergency Shutdown System (ESS)
system which responds to automatic and/or manually activated emergency shutdown devices to stop hazardous movements and operations such as the flow of hydrogen gas to the dispenser and vehicle 3.0 E-Stop
device for manually activating the ESS 3.10 Enclosure
protective housing that may enclose, or partially enclose, equipment such as compressors, valve manifolds, compressed hydrogen storage systems in order to protect equipment from the environment, provide noise attenuation, or provide safety barrier to the areas surrounding the equipment
Note 1 to entry: In this standard the enclosure of the dispenser is defined as a "housing."
Note 2 to entry: Some hydrogen station manufacturers may build an all-in-one fueling station where the dispenser components are built into one side or end of the equipment enclosure without using a separate dispenser housing.

3.11 Fitting
connector used in joining piping, tubing, or components for internal fluid transfer 3.12 Fueling Assembly
part of the dispenser providing the interface between the hydrogen fueling station and the vehicle—an assembly consisting of a breakaway device, a hose(s), a nozzle and connectors between these components 3.13 Fueling Station
facility for the dispensing of compressed hydrogen, which includes all stationary equipment that supplies, compresses, stores, and dispenses gaseous hydrogen to fuel a land vehicle 3.14 Fueling Hose
flexible conduit used for dispensing gaseous hydrogen to vehicles through a fueling nozzle 3.15 Housing
protective structure that encloses process piping and may also enclose measurement, control and ancillary dispenser equipment including point of sale and user authorization interface Note 1 to entry: Housing may be synonymous with: enclosure, cabinet, or frame.

3.16 Hydrogen Service Level (HSL)
pressure level in MPa used to characterize the hydrogen service of the dispenser based on the NWP rating of the vehicle
Note 1 to entry: The numerical value of HSL also matches the number after the "H" in Pressure Class. See the definition of Pressure Class for further discussion.

3.17 Manufacturer
person or organization responsible for the design and fabrication of the equipment and components 3.18 Maximum Allowable Working Pressure (MAWP)
maximum pressure that a component may experience in service, including upset conditions, independent of temperature, before initiating mitigation options, which is typically the basis for the set point of the pressure relief device protecting the vessel or piping system
Note 1 to entry: The maximum allowable working pressure may also be defined as the design pressure, the maximum allowable operating pressure, the maximum permissible working pressure, or the maximum allowable pressure for the rating of pressure vessels and equipment manufactured in accordance with national pressure vessel codes.
Note 2 to entry: For further guidance on pressure terminology, refer to Annex D of ISO/TR 19880-1.

3.19 Nominal Working Pressure (NWP)
pressure to which a full vehicle tank (that is being fueled by the dispenser) settles at a temperature of 15° C.
Note 1 to entry: For further guidance on pressure terminology and associated equipment ratings, refer to Annex D of ISO/TR 19880-1.

3.20 Nozzle
device connected to a fuel dispensing system, which permits the quick connect and disconnect of fuel supply to the receptacle of the vehicle or storage system [SOURCE: ISO 17268]

3.21 Pressure Class
non-dimensional rating for hydrogen vehicle fueling interface hardware that defines the operational pressure limits of a dispenser service (nozzle)
Note 1 to entry: Values are based on achieving the MOP needed to fill the CHSS of the hydrogen vehicle over the full range of operating conditions. See ISO 19880-1 for background and guidance.

3.22 Pressure Safety-Relief Valve (PSV)
pressure-activated valve that opens at a specified set point to protect a system from overpressure and re-closes when the pressure falls below the set point
Note 1 to entry: Pressure safety-relief valves are also known as pressure safety valves (PSVs) and pressure relief valves (PRVs), but the latter term often leads to confusions with pressure regulating valves, also abbreviated PRVs.

3.23 Receptacle
device on the vehicle that receives the nozzle for fueling 3.24 Risk Assessment
determination of quantitative or qualitative value of risk related to a specific situation, recognized threats (also called hazards) and the layers of protection provided by the system design.

3.25 Safety Function
function to be implemented by a control system or safety-instrumented system, which is intended to achieve or maintain a safe state for the process, with respect to a specific hazardous situation 3.26 State of Charge (SOC)
ratio of hydrogen density to the density at the maximum operating pressure rated at the standard temperature 15° C. in a compressed hydrogen storage system (CHSS)
Note 1 to entry: SOC is expressed as a percentage and is computed based on the gas density as per formula below:

$$SOX(\%) = \frac{\rho(P, T)}{\rho(NWP, 15° \text{ C.})} \times 100 \qquad \text{(Eq. 1)}$$

Hydrogen densities of CHSS at the two major nominal working pressures are respectively:
At 35 MPa and 15° C.=24.0 g/L
At 70 MPa and 15° C.=40.2 g/L.

3.27 Target Pressure
dispensing pressure that the hydrogen fueling protocol targets for the end of fueling 3.28 Test Pressure
pressure to which a component or equipment is taken during testing 3.29 Valve
device by which the flow of a fluid may be started, stopped, or regulated by a movable part which opens or obstructs passage

What is claimed is:

1. Apparatus for providing hydrogen to a vehicle, comprising:
   a hose that carries hydrogen from a pump to the vehicle;
   a nozzle attached to an end of the hose and adapted to removably attach to a filling receptacle on the vehicle;
   a handle, attached to the nozzle and adapted to permit movement by a user of the nozzle to permit removable attachment of the nozzle to the filling receptacle on the vehicle;
   one or more temperature sensors disposed on one or more of the hose, handle and the nozzle; and
   an indicator, responsive to the one or more temperature sensors, positioned on one or more of the hose, nozzle and handle that provides a first indication of flow of hydrogen through the hose to the filling receptacle on the vehicle, and that provides a second indication to the user when temperature of a surface of the handle is in a range to cause thermal injury to the user.

2. The apparatus of claim 1 further comprising:
   a transmitter, responsive to the one or more temperature sensors, to provide the first indication and the second indication, to a vehicle communication unit disposed in the vehicle.

3. The apparatus of claim 2 wherein the vehicle communication unit:
   provides at least one of the first indication and the second indication to a location that is separate from the vehicle.

4. The apparatus of claim 1 wherein the indicator comprises a visual indicator.

5. The apparatus of claim 1 wherein the indicator comprises an audible indicator.

6. The apparatus of claim 1 wherein the indicator is positioned on the handle and causes an illumination of an area on the handle.

7. The apparatus of claim 6 wherein the illumination changes in color to reflect:
   flow of hydrogen through the hose to the filling receptacle on the vehicle;
   stoppage of flow of hydrogen through the hose to the filling receptacle on the vehicle; and
   a completion of filling of a hydrogen receptacle on the vehicle that receives the hydrogen by way of the filling receptacle on the vehicle.

8. The apparatus of claim 1 further comprising a sensor positioned on one or more of the hose, nozzle and handle to provide a humidity indication.

9. The apparatus of claim 1 further wherein at least one of the first indication and the second indication is additionally received from a sensor positioned on the vehicle.

10. A method to inform a user of a hydrogen filling apparatus of status of filling of a hydrogen powered vehicle by way of the hydrogen filling apparatus, comprising:
    providing a temperature sensor positioned on one or more of, a hose that carries hydrogen from a pump to the vehicle, a nozzle attached to an end of the hose and adapted to removably attach to a filling receptacle on the vehicle, and a handle attached to the nozzle and adapted to permit movement by a user of the nozzle to permit removable attachment of the nozzle to the filling receptacle on the vehicle;
    responding to a signal generated by the temperature sensor by providing a temperature indication to one or more indicators positioned on one or more of the hose, nozzle and handle to provide an indication to the user that one or more of the hose, nozzle and handle is within a temperature range that will cause thermal injury upon the user touching the handle.

11. The method of claim 10 further comprising:
    providing one or more sensors that provides an indication of flow of hydrogen through one or more of the hose, the handle and the nozzle; and
    responding to a signal by the one or more sensors that provide an indication of flow of hydrogen by providing a hydrogen flow indication to the user that hydrogen is flowing through one or more of the hose, the handle and the nozzle and a hydrogen stopped indication to the user that flow of hydrogen has stopped through one or more of the hose, the handle and the nozzle.

12. The method of claim 11 further comprising:
responding to the signal by the one or more sensors that provide an indication of flow of hydrogen by providing a malfunction indication to that user that there is a malfunction in one or more of the hose, the handle and the nozzle.

13. The method of claim 10 further comprising:
transmitting the signal generated by the temperature sensor to a processing unit disposed remotely from the hydrogen filling apparatus.

14. The method of claim 10 further comprising:
transmitting the temperature indication to a generated by the temperature sensor to a processing unit disposed remotely from the hydrogen filling apparatus.

15. Apparatus for providing hydrogen to a vehicle, comprising:
a hose that carries hydrogen from a pump to the vehicle;
a nozzle attached to an end of the hose and adapted to removably attach to a filling receptacle on the vehicle;
a handle, attached to the nozzle and adapted to permit movement by a user of the nozzle to permit removable attachment of the nozzle to the filling receptacle on the vehicle;
one or more sensors positioned on the handle that provide an indication of malfunction in flow of hydrogen through the hose; and
an indicator positioned on one or more of the hose, nozzle and handle that is responsive to a signal received from the one or more sensors to provide an indication, when a surface of one or more of the hose, nozzle and handle is in a temperature range to cause thermal injury to the user, to indicate to the user to not touch the hose, nozzle and handle.

16. The apparatus of claim 15 wherein the indicator provides a visual indication and wherein the vehicle comprises a wheeled vehicle.

17. The apparatus of claim 15 wherein the indicator provides a visual indication and wherein the vehicle comprises a water-based vehicle.

18. The apparatus of claim 15 wherein the indicator provides a visual indication and wherein the vehicle comprises an airborne vehicle.

19. The apparatus of claim 15 wherein the indicator is positioned on a grip area of the handle.

20. The apparatus of claim 15 further comprising:
a transmitting unit that transmits the signal received from the one or more sensors to provide the indication to a processing unit disposed remotely from the hose, the nozzle, the handle and the vehicle.

21. The apparatus of claim 15 wherein the indicator positioned on one or more of the hose, nozzle and handle is further responsive to a signal received from a receptacle temperature sensor mounted to detect temperature of the filling receptacle on the vehicle to provide an indication, that the receptacle on the vehicle is in a temperature range to cause thermal injury to the user, to indicate to the user to not touch the filling receptacle on the vehicle.

22. The apparatus of claim 15 wherein one of the one or more sensors provide an indication of malfunction in flow of hydrogen through the hose by detecting freezing of the nozzle to the filling receptacle on the vehicle.

* * * * *